(12) United States Patent
Longdale

(10) Patent No.: US 10,361,982 B2
(45) Date of Patent: Jul. 23, 2019

(54) INTERACTIVE MESSAGE-BASED DELIVERY OF NARRATIVE CONTENT USING A COMMUNICATION NETWORK

(71) Applicant: DAYBREAK GAME COMPANY LLC, San Diego, CA (US)

(72) Inventor: Holly Longdale, San Diego, CA (US)

(73) Assignee: Daybreak Game Company LLC, San Diego, CA (US)

(*) Notice: Subject to any disclaimer, the term of this patent is extended or adjusted under 35 U.S.C. 154(b) by 117 days.

(21) Appl. No.: 15/434,992

(22) Filed: Feb. 16, 2017

(65) Prior Publication Data

US 2017/0339089 A1 Nov. 23, 2017

Related U.S. Application Data

(60) Provisional application No. 62/337,610, filed on May 17, 2016.

(51) Int. Cl.
*H04L 12/58* (2006.01)
*H04L 29/06* (2006.01)
(Continued)

(52) U.S. Cl.
CPC .............. *H04L 51/18* (2013.01); *A63F 13/47* (2014.09); *A63F 13/60* (2014.09);
(Continued)

(58) Field of Classification Search
CPC ....... H04L 51/18; H04L 51/16; H04L 67/306; H04L 67/12; H04L 51/32; H04L 51/02;
(Continued)

(56) References Cited

U.S. PATENT DOCUMENTS 7,225,233 B1 5/2007 Fenton
2007/0204211 A1 8/2007 Paxson
(Continued)

FOREIGN PATENT DOCUMENTS

EP 2493140 A1 8/2012
WO WO 2014/027103 A1 2/2014

OTHER PUBLICATIONS

Lifeline Mobile App, Available for Download from the iTunes website as of Feb. 16, 2017 at https://itunes.apple.com/us/app/lifeline.../id982354972?mt=8.
(Continued)

*Primary Examiner* — Shean Tokuta
*Assistant Examiner* — Juan C Turriate Gastulo
(74) *Attorney, Agent, or Firm* — Lorenz & Kopf, LLP

(57) ABSTRACT

A system and related methodologies of delivering storyline content to users are presented herein. A server system maintains storyline data corresponding to an interactive narrative storyline having variable narrative paths that influence outcomes of the storyline. Storyline messages are communicated from the server system using a messaging service, wherein each communicated storyline message includes a portion of the narrative storyline. The server system receives messages generated from the subscriber device in response to communicated storyline messages, wherein each response message includes a user-specified storyline option. Subsequent storyline messages are retrieved by the server system based on the user-specified storyline options conveyed with the user responses.

14 Claims, 9 Drawing Sheets

(51) Int. Cl.
    *H04L 29/08*     (2006.01)
    *G06F 17/22*     (2006.01)
    *G06F 17/24*     (2006.01)
    *A63F 13/60*     (2014.01)
    *A63F 13/47*     (2014.01)
    *G06F 3/0484*     (2013.01)

(52) U.S. Cl.
    CPC .......... *G06F 17/2235* (2013.01); *G06F 17/24* (2013.01); *H04L 51/02* (2013.01); *H04L 51/046* (2013.01); *H04L 51/16* (2013.01); *H04L 65/403* (2013.01); *H04L 67/02* (2013.01); *H04L 67/025* (2013.01); *H04L 67/18* (2013.01); *H04L 67/20* (2013.01); *H04L 67/306* (2013.01); *A63F 2300/407* (2013.01); *A63F 2300/5506* (2013.01); *A63F 2300/5533* (2013.01); *A63F 2300/572* (2013.01); *A63F 2300/6009* (2013.01); *A63F 2300/632* (2013.01); *A63F 2300/807* (2013.01); *G06F 3/04842* (2013.01); *H04L 51/32* (2013.01); *H04L 67/12* (2013.01)

(58) Field of Classification Search
    CPC . H04L 51/046; H04L 65/403; G06F 3/04842; G06F 17/2235; G06F 17/24; A63F 2300/407; A63F 2300/5506; A63F 2300/5533; A63F 2300/572; A63F 2300/6009; A63F 2300/632; A63F 2300/807; A63F 13/60; A63F 13/47

See application file for complete search history.

(56) References Cited

U.S. PATENT DOCUMENTS

| | | | |
|---|---|---|---|
| 2008/0269919 A1* | 10/2008 | Nissen | G06F 3/0481 700/32 |
| 2011/0107217 A1 | 5/2011 | Schwarz | |
| 2012/0094768 A1 | 4/2012 | McCaddon et al. | |
| 2013/0179803 A1* | 7/2013 | Melet | G06F 17/30899 715/753 |
| 2015/0004591 A1 | 1/2015 | Lidey et al. | |
| 2015/0221169 A1 | 8/2015 | Filipour | |
| 2015/0258454 A1 | 9/2015 | King et al. | |
| 2015/0375115 A1* | 12/2015 | Bunting | A63F 13/47 463/29 |

OTHER PUBLICATIONS

Laura Hudson, I've been texting with an astronaut, Apr. 15, 20016, Wayback, pp. 1-9.

Michael Kriegel, et al., An Authoring Tool for an Emergent Narrative Storytelling System, 2007, aaai.org, pp. 108.

* cited by examiner

INTERACTIVE MESSAGE-BASED DELIVERY OF NARRATIVE CONTENT USING A COMMUNICATION NETWORK

CROSS-REFERENCE TO RELATED APPLICATION

This application claims the benefit of U.S. provisional patent application No. 62/337,610, filed May 17, 2016.

TECHNICAL FIELD

Embodiments of the subject matter described herein relate generally to entertainment and media delivery services. More particularly, embodiments of the subject matter relate to techniques, systems, and technologies that provide an interactive message-based narrative entertainment service to users of electronic devices.

BACKGROUND

The prior art is replete with video games, mobile apps, messaging services, social media platforms, and the like. These, and other conventional systems and methodologies, can be utilized to deliver various forms of entertainment and content to end users. Narrative video games, electronic books, video clips, and other content can be delivered from a service provider to users of electronic devices on demand if so desired. Ideally, dynamic and interactive content should engage end users, keep their attention, and represent good consumer value.

Accordingly, it is desirable to have an interactive message-based service that delivers on-demand entertainment (such as narrative stories) to end users. Furthermore, other desirable features and characteristics will become apparent from the subsequent detailed description and the appended claims, taken in conjunction with the accompanying drawings and the foregoing technical field and background.

BRIEF SUMMARY

A method of delivering storyline content to users is presented here. An exemplary embodiment of the method maintains storyline data corresponding to an interactive narrative storyline having variable narrative paths that influence at least one outcome of the interactive narrative storyline. A server system is used to communicate a storyline message using a messaging service, the communicated storyline message intended for a subscriber device, and the communicated storyline message including a portion of the interactive narrative storyline. The server system receives a response message generated from the subscriber device in response to the communicated storyline message, wherein the response message includes a user-specified storyline option. The server system retrieves the next storyline message, which has a subsequent portion of the interactive narrative storyline that is dictated by the user-specified storyline option. Thereafter, the server system communicates the next storyline message using the messaging service. The next storyline message is intended for the subscriber device.

Also disclosed here is a computer-based server system having a memory element and a processor device communicatively coupled to the memory element. The memory element has computer executable instructions stored thereon and configurable to be executed by the processor to cause the server system to: maintain storyline data corresponding to an interactive narrative storyline comprising variable narrative paths that influence at least one outcome of the interactive narrative storyline; communicate a storyline message using a messaging service, the communicated storyline message intended for a subscriber device, and the communicated storyline message including a portion of the interactive narrative storyline; receive a response message generated from the subscriber device in response to the communicated storyline message, the response message including a user-specified storyline option; retrieve a next storyline message comprising a subsequent portion of the interactive narrative storyline, the retrieving dictated by the user-specified storyline option; and after retrieving the next storyline message, communicate the next storyline message using the messaging service, the communicated next storyline message intended for the subscriber device.

Another method of delivering storyline content to users is also presented here. The method maintains, by a server system, storyline data corresponding to an interactive narrative storyline including variable narrative paths that influence at least one outcome of the interactive narrative storyline. The method continues by communicating storyline messages from the server system to a plurality of subscriber devices associated with a plurality of different users, each communicated storyline message comprising a portion of the interactive narrative storyline and a plurality of candidate storyline options. The server system receives response messages generated from at least two of the plurality of subscriber devices in response to the storyline messages, each received response message identifying one of the plurality of candidate storyline options, resulting in a plurality of identified candidate storyline options. The server system performs a statistical analysis on the plurality of identified candidate storyline options and retrieves the next storyline message with a subsequent portion of the interactive narrative storyline, wherein the retrieving is dictated by the statistical analysis performed on the plurality of identified candidate storyline options. Thereafter, the next storyline message is communicated from the server system using the messaging service, the communicated next storyline message intended for at least one of the plurality of subscriber devices.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
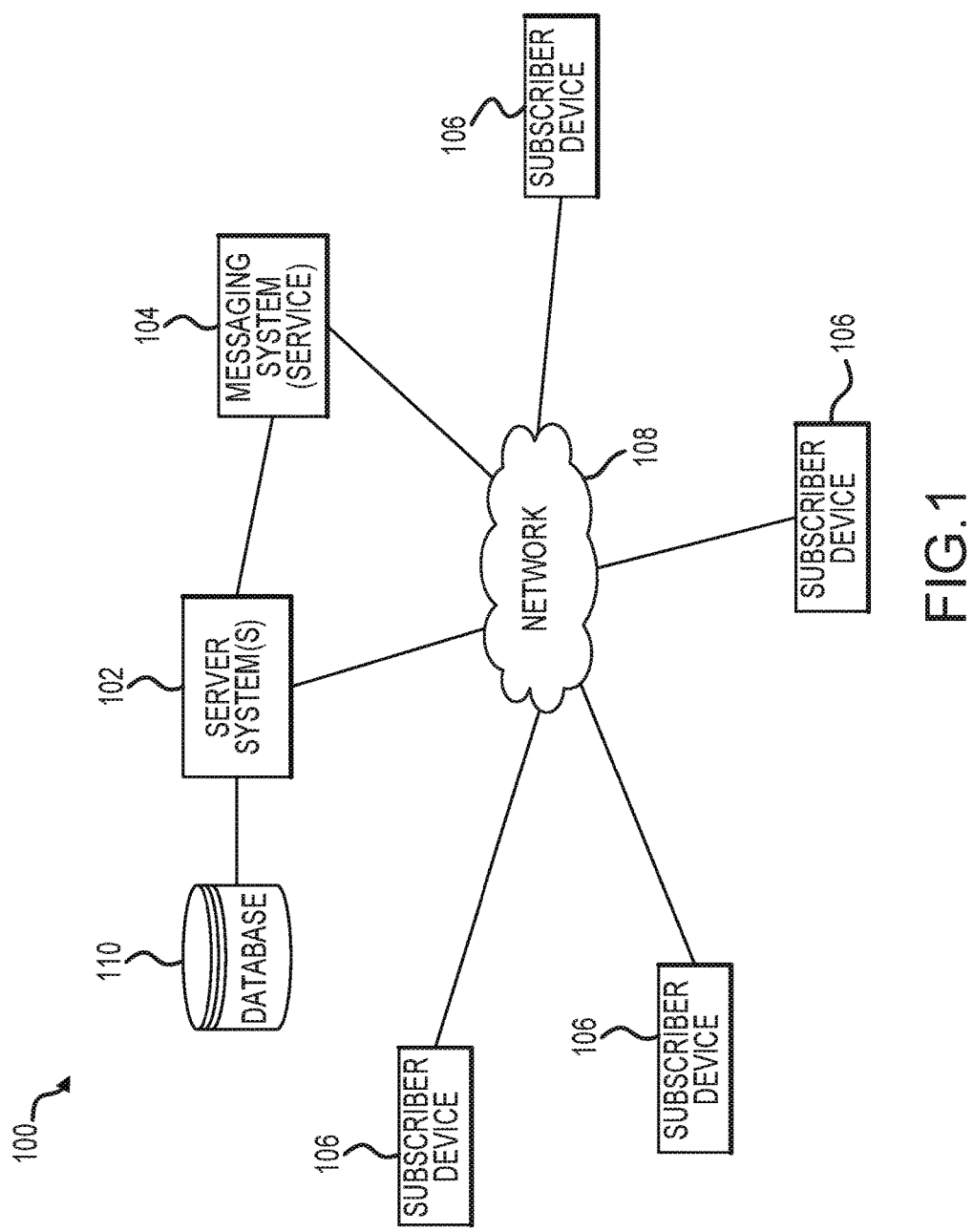
FIG. 1 is a simplified block diagram representation of an exemplary embodiment of a message-based narrative content delivery system (NCDS)

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or the like, various elements of the systems described herein are essentially the code segments or instructions that cause one or more processor devices to perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Overview

The message-based narrative content delivery system (NCDS) described herein provides an interactive service and two-way messaging system that delivers on-demand entertainment (in the form of narrative fiction, for example) via an appropriate messaging platform. Outgoing messages are sent to the user via a chosen, preferred, or default messaging service (e.g., a text messaging app on a mobile device, a messaging app or service provided by a social media platform, an email service, an instant messaging app, or a customized client app that is specifically designed to support the NCDS). Users respond to messages sent by the NCDS with a text message, button selection, or other identified response (photo, location, etc.) in order to advance content via delivery of new messages. In accordance with certain embodiments, narrative content proceeds based on the user's chosen or correct response until the story is completed. At the completion of the story, the user has experienced a unique narrative resulting from choices made during the experience.

The NCDS, which manages the content delivered for interactive narrative storylines, is agnostic to the process or processes that are handling the data, input, and display to the reader. The various functions and features supported by the NCDS can all be contained within one process (executable or app) or they can be easily split between client apps (that handle the gathering of input and displaying of output) and one or more server-based processes.

The NCDS is an entertainment service founded on the principle of a library of branching stories that users navigate by sending and receiving messages back and forth between a content delivery server system and respective subscriber devices. The server system responds to specific commands, instructions, or selections received from the subscriber/client devices. As a single user progresses through a narrative storyline, the server system will store relevant information and retrieve it when necessary in order to deliver a unique narrative experience based on the various user decisions.

The service is based on dynamic and ongoing interaction between the user (by way of the user's subscriber device) and the server system, and the service can be used in combination with any messaging system available on the market today or in the future, including, without limitation: the MESSENGER service provided by FACEBOOK; the SKYPE web-based communication service; Short Message Service; Multimedia Messaging Service; the TWITTER social media platform; the HANGOUTS communication platform provided by GOOGLE; the WHATSAPP messaging service; the VOXER communication service; and the like. Although text-based messaging services are suitable for use with the NCDS, other services and methodologies can be used, including, without limitation: instant messaging; email; social media comment threads; web-based two-way apps and services; image messaging services such as the SNAPCHAT service; voice recognition messaging tools and apps; customized and/or devoted client apps; and the like.

The NCDS supports at least two different content delivery modes (or story types): single user stories and multiuser stories. Single user stories can be made available for online delivery or offline consumption (for example, by way of a local download option). For the single user mode, the narrative storyline flow is controlled by only one user/subscriber, and the pace at which the user progresses through the storyline is primarily (or exclusively) dictated by the user's individual interaction with the narrative storyline. In contrast to single user stories, multiuser stories collect and act upon the feedback and input of at least two different users. Thus, in a multiuser story, the narrative storyline flow can be individually controlled by each respective user until a point in the story that requires a decision, a choice, or some form of user interaction. At certain decision points, the server system collects the responses from multiple users, processes or analyzes the collected responses, and determines how the storyline is to proceed based on the collected responses.

The particular formatting, content, and configuration used for the narrative storyline messages can vary from one embodiment to another as needed to suit the particular needs and requirements of the platform, subscriber devices, and the like. In accordance with text message based embodiments, the NCDS defines user responses primarily through the use of square brackets (or any designated characters)

within the text content itself for any messaging service in use, wherein each segment of bracketed text represents a storyline option that can be chosen by the user. For example, the following message includes two choices for the user: "You are running across a broken bridge, but you may not make it if you [jump]. Maybe you should [stop] instead." In this scenario, the user can respond with a text message that includes the word "jump" or with a text message that includes the word "stop" to indicate the chosen storyline option. The user inputs and sends the text contained inside the brackets to the server system to indicate her response during the current state or stage in a story.

In the above example, assume that the user texted "jump" to the service as her choice. The service responds by delivering a follow up narrative storyline message that is contextually related to the decision to jump. In this case, the next delivered content stage might be: "Of course you didn't make it. You're not a mutant superhero, you tell yourself, as you fall into the raging river below. In a panic you see a [log] about to float by between you and the [riverbank]." From this point, the user continues to advance the storyline in a linear or serial manner by making additional choices indicated in the narrative storyline messages.

Specified punctuation marks or characters may be used in a similar fashion to indicate other actions, or even open-ended responses that deliver no options in the content, but are indicated at the outset of an experience. For example, the service can provide the following notification to the user at the beginning of a story: "The following commands are available during this experience: left, right, forward, backward, up, down, and use."

The service is designed to retain data on each user's current stage or state of the narrative storyline and, based on the response received, deliver the correlating text response associated with the received command. The service may have a core set of instructions available using "help" as a command to deliver status data to the user in order to provide additional information regarding the user and/or current entertainment stage.

The NCDS can utilize at least two primary narrative types to delivery narrative content to a subscriber: linear and free-roam narratives. A linear narrative storyline works by funneling the user through a series of defined choices. The user responses to the choices determine the outcome of the narrative storyline and the manner in which the outcome is reached. A free-roam narrative storyline is less restrictive, but not as concise. Instead of funneling the user, a free-roam narrative storyline gives the user the ability to move about a virtual world (conveyed via text messages or commands) and decide what to do and where to go next. A linear narrative is the most basic type of narrative. It simply presents the user with decisions. The user responses are stored as the user directs the narrative experience. The following is an example of a linear narrative:

Received Text: Little Red Riding Hood looks at the fork in the path. To the right are wolf prints in the dirt. To the left are drops and smears of blood. Should she go [right] or [left]?

At this point the user can respond with a reply text that includes either "right" or "left", and the next text received at the subscriber device will be based on the user's reply. Thus, if the user replies with "right" then the next received text might be: "I'm pretty sure it's this way," Red whispers with a shiver as she starts down the [path] with the wolf prints. If, however, the user replies with "left" then the next received text might be: Red inches alongside the trail of blood and hears low, ragged breaths ahead. She slowly inches [closer] and hears a whimper of pain.

In certain embodiments, linear storytelling can utilize a gate method, where a series of choices branch out into different experiences, but will converge at common narrative points or "gates" in order to ensure that the story stays manageable between episodes and major events.

A free-roam narrative storyline is a more complex type of narrative that is akin to a text-based role playing game. In some embodiments, the user has access to a universal command list that can be used to interact with the free-roam narrative. The universal commands are used to advance the narrative. Suitable commands may include, without limitation: Go (in a specified direction); Look; Read; Take; Climb; Drop; Attack; Help; Communicate; Walk; Jump; and Stop. The NCDS can employ a predefined global list of potentially valid user commands, only some of which might be usable for a given point in a free-roam story, depending on the current state/status of the storyline. In certain embodiments, the NCDS can dynamically adjust or update the list of potentially valid commands in an ongoing manner in response to user feedback, for a customized user experience, or the like. Moreover, the list of potentially valid commands can vary from one free-roam story to another. The following is an example of a free-roam narrative:

Received text: "You are standing in an open field west of a white house, with a boarded front door. There is a small mailbox here." The user can respond with any number of different commands:

Look: the scene text is repeated
Go south: the scene switches to south of the house
Go east: the scene switches to behind the house
Open mailbox: the mailbox is opened Choosing any one of these commands doesn't prevent the user from returning to the first scene and doing something different (or the same). Thus, the free-roam narrative storyline may progress in the following manner:

Received text: "You are standing in an open field west of a white house, with a boarded front door. There is a small mailbox here."
Sent text: "Go east"
Received text: "You are behind the white house. There is no door here, and all the windows are boarded."
Sent text: "Go west"
Received text: "You are standing in an open field west of a white house, with a boarded front door. There is a small mailbox here."
Sent text: "Open mailbox"
Received text: "Opening the mailbox reveals a small leaflet"
Sent text: "Read leaflet"
Received text: "Welcome to the next big thing in mobile gaming and storytelling!"

A free-roam narrative embodiment should contemplate errors or unrecognizable user responses. Thus, if an unrecognized or invalid word or phrase is received by the server system, the system can generate and communicate a suitably formatted warning message (which is intended for the user of the subscriber device). For example, the warning or error message may be a text message that conveys "That command is not recognized, please try again." If invalid or unrecognized response messages are repeatedly received (e.g., three in a row), then the next message may contain additional information or a hint that helps the user understand what they should be doing. For example, a follow-up text message can include a link to instructions or to a hints or tips page.

The NCDS can leverage global positioning system features and functionality to provide geo-location based narrative storylines. In this regard, the narrative storyline messages sent to the subscriber devices may include location aware information or choices, and reply messages generated by the subscriber devices may include global positioning system (GPS) data that identifies the location of the user. In this way, a geo-location enabled storyline can be used to deliver content similar to a scavenger hunt that reveals new clues or story elements through a variety of locations and clues or directions. This type of narrative storyline might require the user to reply to the server system with a geo-tagged message, image, or have location GPS detection activated on the subscriber device when they reply. If the user is not at a specified location when they reply, then the narrative storyline will not advance.

The NCDS can also leverage the camera features and functionality of subscriber devices. For example, photo-recognition can be utilized to detect objects, shapes, landmarks, and/or facial expressions for purposes of driving the narrative storyline forward. Accordingly, a storyline message delivered to a subscriber device may instruct the user to capture an image of a certain necessary object or relay a particular facial expression back to the server system. Branching storylines could be made to diverge based on a facial expression or an image of an item received with a user reply. This image-based feature can also be used in conjunction with the geo-location feature described above, requiring images of certain things to be conveyed with a specific geo-tagged location to ensure authenticity.

The NCDS can also include visual content in the narrative storyline messages sent to users. To this end, the NCDS can provide pictures, animations, video content, and/or links that point to such content as supplemental content with text messages. Images can be delivered to subscribers who use certain types of mobile apps or web apps to inform details on scenes, characters, or choices. Images could also be used to unlock new content. For example, a narrative storyline can be authored such that there will be no contextual command for a doorknob until the user examines an image of it and then tries to turn the doorknob.

In accordance with certain embodiments, the NCDS maintains and updates a user profile database that includes choice profile database objects corresponding to the subscribers. Each choice profile database object includes dynamically updateable user profile data that reflects the choices made by the user. Thus, choice profile data can be generated for every decision the user makes within the narrative storylines. In certain embodiments, the NCDS utilizes internal trait tags or metadata associated with the various user-specified storyline options or choices. At least some choices presented to the user can relate to any number of defined traits and respective attributes. The embodiment described herein can be considered using the following non-limiting examples of core personality traits—Attitude, Analysis, Approach—and their respective attributes: Attitude=Extrovert/Introvert; Analysis=Logic/Emotion; Approach=Structured/Spontaneous. When the user completes a narrative storyline (only when completed to avoid them reloading and skewing their tags over and over) the corresponding choice profile database object is updated to "adjust" the attributes for the particular traits. Moreover, a profile type can be assigned to the user based on the current status of identified and monitored traits. In this way, a user's profile type can be dynamically updated over time to reflect additional content. The profile data can also be used to help develop a detailed purchase profile for the user to drive more accurate recommendations as well as shape future content releases. It should be appreciated that the personality traits and associated attributes mentioned above are merely exemplary. An implementation of the NCDS can employ additional and/or alternative personality traits, with or without corresponding attributes if so desired.

The NCDS may also include various statistics-related features or functions that are associated with user choices. For example, at the end of each chapter in a story the NCDS can generate a report that includes statistics related to user choices made during the chapter and/or during the story up to that point. The statistics can highlight important or relevant choices in a way that conveys a summary to the user. Statistical data related to user decisions can also be used for activity feed pushes and friend notifications.

Exemplary Embodiments

Turning now to the drawings, FIG. 1 is a simplified block diagram representation of an exemplary embodiment of a message-based narrative content delivery system (NCDS) 100. The NCDS 100 generally includes, without limitation: a cloud-based server system 102; at least one messaging system or service 104; and one or more subscriber devices 106. The NCDS 100 includes or cooperates with a communication network 108 that supports data communication between the various components of the NCDS 100. It should be appreciated that a practical implementation of the NCDS 100 may include additional devices, components, subsystems, and elements configured to support conventional features and functions (which will not be described herein).

The server system 102 can be realized using one or more computer-implemented components (which may be arranged in a physically distributed configuration or co-located if so desired). The computer-based server system 102 is suitably designed, configured, and programmed to support the various functions, processes, and tasks described in more detail below. In this regard, the server system 102 can include a plurality of logical and/or physically distinct modules or processing components that perform various functions such as, without limitation: user/subscriber account creation and management, including purchase of content via, for example, an online store; user/subscriber authentication; creating, editing, and maintaining narrative storyline files; digital content management; generating and sending narrative storyline messages; receiving and processing user response messages; and processing data associated with received user response messages.

The server system 102 includes, cooperates with, and/or communicates with at least one database system 110. The configuration and operation of databases and database management systems are well known, and such conventional aspects of the database system 110 will not be described herein. The database system 110 can include or be associated with any number of physical and/or logical database structures that are arranged to store and maintain data used by the NCDS 100. Accordingly, the database system 110 can handle any of the following, without limitation: storyline data corresponding to the interactive storylines provided by the NCDS 100; subscriber/user authentication and account data; subscriber/user profile data including all actions and activity in single and multiuser storylines; multimedia content that can be delivered with narrative storyline messages; and statistical data associated with user response messages. The storyline data maintained by the server system 102 defines variable narrative paths for each interactive narrative storyline, wherein the variable narrative paths influence at least one outcome of each storyline. In other words, the storyline data contemplates multiple variations in how a story progresses from a starting point to at least one endpoint; any given variation will be determined by choices made by the user.

The exemplary embodiment of the NCDS 100 is suitably configured to send narrative storyline messages from the server system 102 to the subscriber devices 106, and to handle user response messages sent from the subscriber devices 106 to the server system 102. In practice, the NCDS 100 may include or cooperate with at least one messaging service 104 that handles the communication of such messages. In certain embodiments, the NCDS 100 is compatible with a wide variety of messaging protocols, applications, service providers, and the like. Thus, the messaging service 104 may include or be configured as a text messaging service, an instant messaging service, an email service, a social media application, or the like. Moreover, the messaging service 104 may be affiliated with or maintained by an entity that is different than the entity that is associated with the NCDS 100. For example, a first entity that controls the operation of the NCDS 100 may have operating agreements with a second entity that controls the operation of the messaging service 104. In this context, the second entity might be a company that is associated with an existing messaging platform, such as, without limitation: the MESSENGER service provided by FACEBOOK; the SKYPE web-based communication service; a cellular service provider that provides its own text messaging app; the TWITTER social media platform; the HANGOUTS communication platform provided by GOOGLE; the WHATSAPP messaging service; the VOXER communication service; and the like.

The NCDS 100 can support any number of subscriber devices 106. For simplicity and ease of illustration, FIG. 1 only depicts four subscriber devices 106. Each subscriber device 106 is implemented as a computer-based hardware component. Thus, each subscriber device 106 generally represents an electronic device coupled to the network 108, which may be utilized by a user to interact with the narrative storyline features of the NCDS 100. In practice, a subscriber device 106 can be realized as any sort of personal computer, mobile telephone, tablet, wearable device, gaming device, digital media player device, entertainment device, or other network-enabled electronic device that includes or cooperates with a display element.

The server system 102, the messaging service 104, and the subscriber devices 106 are communicatively coupled to the network 108, as mentioned above. The network 108 may include any suitably configured and arranged data communication network, or a combination of networks. For example, the network 108 can be any one or any combination of a LAN (local area network), WAN (wide area network), telephone network, wireless network, point-to-point network, satellite network, short range wireless link, or the like. The NCDS 100 can utilize any network protocol, as appropriate to the particular implementation.

The exemplary embodiment described herein assumes that the server system 102 performs the bulk of the processing required to support the operation of the NCDS 100. In alternative embodiments, however, at least some of the functionality can reside locally at the subscriber device 106. For example, the narrative storyline data, multimedia content, and processing logic that determines how best to handle user response messages can reside at the subscriber device 106. In some embodiments, the server system 102 can be used for user authentication, account management, and other system-wide processes, while the actual storyline data and related content is downloaded to the subscriber device 106 for local execution in a protected, proprietary format (encrypted), without continuous communication with the server system 102. In this regard, the server system 102 may include or cooperate with a suitably configured digital rights management (DRM) system, module, or service if so desired. These and other practical operating scenarios are contemplated by this disclosure.

Figure 2:
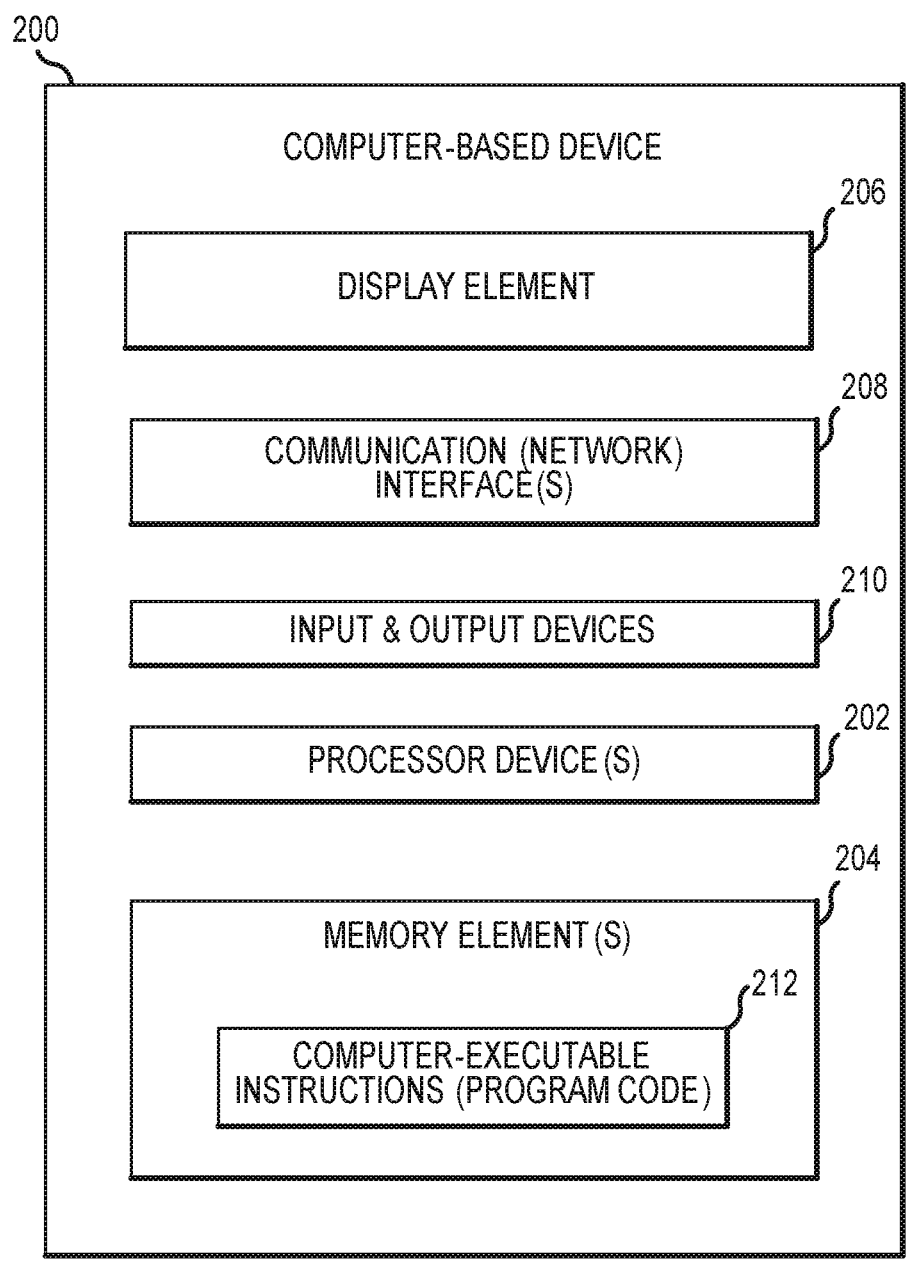
FIG. 2 is a simplified block diagram representation of an exemplary embodiment of a computer-based device that is suitable for use in the NCDS depicted in FIG. 1.

Each subscriber device 106, the server system 102, and the system that provides the messaging service 104 can be implemented using at least one suitably configured computer-based or processor-based platform. In this regard, FIG. 2 is a simplified block diagram representation of an exemplary embodiment of a computer-based device 200 that is suitable for use in the NCDS 100. The device 200 generally includes, without limitation: at least one processor device 202; at least one memory element 204; a display element 206; at least one communication (network) interface 208; and input and output (I/O) devices 210. In practice, the device 200 can include additional components, elements, and functionality that may be conventional in nature or unrelated to the core functionality of the NCDS 100.

A processor device 202 may be, for example, a central processing unit (CPU), a field programmable gate array (FPGA), a microcontroller, an application specific integrated circuit (ASIC), or any other logic device or combination thereof. The memory element 204 is communicatively coupled to the processor device 202, and it can be implemented with any combination of volatile and non-volatile memory. The memory element 204 has non-transitory computer-executable instructions (program code) 212 stored thereon, wherein the instructions 212 are configurable to be executed by the processor device 202 as needed. When executed by the processor device 202, the instructions 212 cause the processor device 202 to perform the associated tasks, processes, and operations defined by the instructions 212. Of course, the memory element 204 may also include instructions associated with a file system of the host device 200 and instructions associated with other applications or programs. Moreover, the memory element 204 can serve as a data storage unit for the host device 202.

The display element 206 may be integrated with the device 200 or coupled to the device 200 as a peripheral. The shape, size, resolution, and technology of the display element 206 will be appropriate to the particular implementation of the device 200. The display element 206 can be realized as a monitor, screen, or another conventional electronic display that is capable of graphically presenting data and/or information provided by the device 200. In certain embodiments, the display element 206 is a touch-enabled display (e.g., of the type commonly used with mobile phones).

The communication interface 208 represents the hardware, software, and processing logic that enables the device 200 to support data communication with other devices, via the network 108. In practice, the communication interface 208 can be suitably configured to support wireless and/or wired data communication protocols as appropriate to the particular embodiment. For example, if the device 200 is a smartphone, then the communication interface 208 can be designed to support a cellular communication protocol, a short-range wireless protocol (such as the BLUETOOTH communication protocol), and a WLAN protocol. As another example, if the device 200 is a desktop or laptop computer, then the communication interface can be designed to support the BLUETOOTH communication protocol, a WLAN protocol, and a LAN communication protocol (e.g., Ethernet).

The I/O devices 210 enable the user of the device 200 to interact with the NCDS 100 as needed. In practice, the I/O device 210 may include, without limitation: a speaker; a haptic feedback device; a microphone; a mouse or other pointing device; a touchscreen or touchpad device; a keyboard; a joystick; or any conventional peripheral device. In this context, the display element 206 can be categorized as an I/O device 210.

Figure 3:
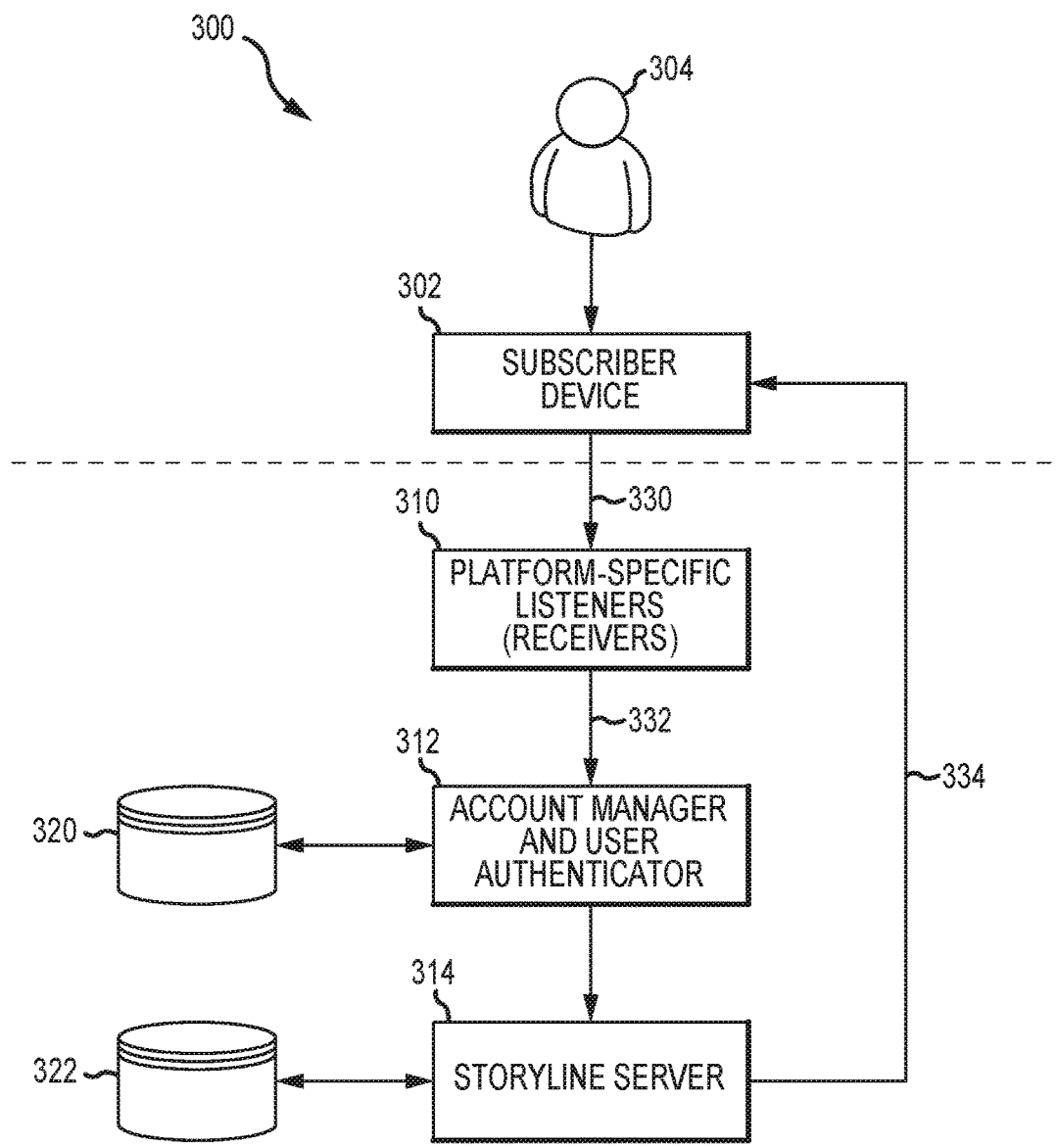
FIG. 3 is a simplified block diagram representation of an exemplary implementation of a message-based NCDS.

FIG. 3 is a simplified block diagram representation of an exemplary implementation of a message-based NCDS 300. This particular embodiment of the NCDS 300 assumes that a subscriber device 302 is operated by a user 304, and that the subscriber device 302 is suitably configured to receive narrative storyline messages and generate associated response messages as needed to move forward through a narrative storyline. It should be appreciated that an NCDS as described herein need not be configured as depicted in FIG. 3; the embodiment depicted in FIG. 3 is merely one practical and suitable deployment. The elements below the dashed line in FIG. 3 represent the "cloud-based" or "server-side" components/modules of the NCDS 300. Accordingly, the elements below the dashed line correspond to the server system(s) 102 and the database system 110 shown in FIG. 1. In contrast to the server-based components, the subscriber device 302 is considered to be a "local" or "client-side" component of the NCDS 300. In practice, the NCDS 300 can include any number of NCDS servers working in conjunction with one another to provide the required functionality.

The illustrated embodiment of the NCDS 300 includes platform-specific listeners 310 (also referred to herein as listener servers), an account manager and user authentication module 312, and a storyline server 314. The account manager and user authentication module 312 includes or cooperates with a suitably arranged account database 320, and the storyline server 314 includes or cooperates with a suitably arranged story database 322. Although the databases 320, 322 are depicted as separate components, they can be realized as two logical partitions of a single database if so desired. Moreover, the listeners 310, the account manager and user authentication module 312, and the storyline server 314 can be realized using one piece of computer-based equipment or using a plurality of distinct computer-based hardware components that cooperate with one another to support the desired operating features of the NCDS 300.

The platform-specific listeners 310 receive and parse input 330 obtained from the subscriber device and other subscriber devices. As explained above, NCDS 300 is preferably compatible with a variety of different messaging apps, programs, methodologies, and protocols. To this end, the NCDS 300 includes at least one listener 310 for each unique input message source or type (e.g., one assigned to handle messages generated by the MESSENGER service provided by FACEBOOK, another one assigned to handle messages generated by the TWITTER social media service, and yet another one assigned to handle SMS messages). In this regard, one or more NCDS servers can be connected to any number of listener servers, including multiple listener servers per messaging application or type. The listeners 310 monitor the incoming message streams to parse the input corresponding to each unique message source. The listeners 310 determine the source of each incoming message, parse out any appropriate data from the corresponding user input, and pass the extracted data along to the backend system. The parsed input 332 is presented to the account manager and user authentication module 312.

The specific functionality of each listener 310, such as the parsing and identification functions, varies based on the type of message as received. For example, the listeners 310 associated with a customized client app, the FACEBOOK MESSENGER app, and a conventional SMS/MMS app can be suitably configured for compatibility with those particular apps. In accordance with an exemplary embodiment of a customized client app, the listener 310 connects directly to the NCDS server and sends pure text to it for user input. The NCDS server then sends pure raw text back to the user with tags for any visual or audio to play.

For a third party app, such as the FACEBOOK MESSENGER app, incoming messages can be initially handled by an app or service provided by the third party, wherein the third party app serves as an intermediary for the corresponding listener 310. The third party app communicates with the NCDS server, which in turn communicates with the listener 310 assigned to the third party app. The listener 310 is responsible for reformatting messages for compatibility with the third party app, such that the NCDS 300 can deliver storyline messages in a format that is consistent with the requirements of the third party messaging app.

For an SMS/MMS (texting) app, messages sent to one or more phone numbers (in practice, the NCDS 300 will likely have multiple phone numbers associated therewith) will be handed by the corresponding SMS listener 310. That listener 310 will obtain the sender phone number and the associated text content. The sender phone number and text is sent (via packet) to the NCDS server, which processes the text and replies to the SMS listener 310 with the next text content to be returned to the client device. The SMS listener 310 creates a suitably formatted message with the appropriate phone number and reply message content, which might include a URL. Note that the SMS listener 310 can divide the reply message content in to multiple messages if needed to comply with message size limitations. Moreover, the SMS listener 310 can communicate with a third party service (e.g., a platform as a service company such as the TWILIO platform) that acts as an intermediary to handle the sending of the actual text messages to the end users.

The account manager and user authentication module 312 obtains the parsed input 332 and attempts to authenticate the user identified in the parsed input 332. The account database 320 is accessed during this authentication routine. Assuming that the user is authenticated, the corresponding account information and the parsed input 332 is provided to the storyline server 314 for processing. The storyline server 314 accesses the story database 322 to obtain the next narrative storyline message 334, which is communicated back to the subscriber device 302 for presentation to the user 304. In practice, the same communication channel or mode that was used to receive the input 300 is also used for communication of the next narrative storyline message 334.

The formatting, content, display characteristics, and/or functionality of the narrative storyline messages can vary as needed to suit the capabilities of the particular subscriber device platforms and messaging applications. Accordingly, a particular narrative storyline message can include: text; image content; video content; hypertext; active control elements, such as selectable buttons; audio content; voice recognition features or functionality; or any combination thereof. In this regard, a storyline message can include a background soundtrack that plays while the message is displayed to the user. As another example, a storyline message can include sound effects that are triggered when the user enters/exits the message. Moreover, the arrangement of the message content and visual characteristics of the narrative storyline message can vary to accommodate the particular subscriber device and messaging application used to interact with the NCDS. Consequently, the experience of the user can vary depending on how they are consuming the story. For example, if the user is interacting with a story using the FACEBOOK service, then audio, music, and sound effects might be part of the experience. In contrast, if the user is interacting with the same story using a basic SMS app, then enhanced multimedia features might be disabled or missing from the experience.

Figure 5:
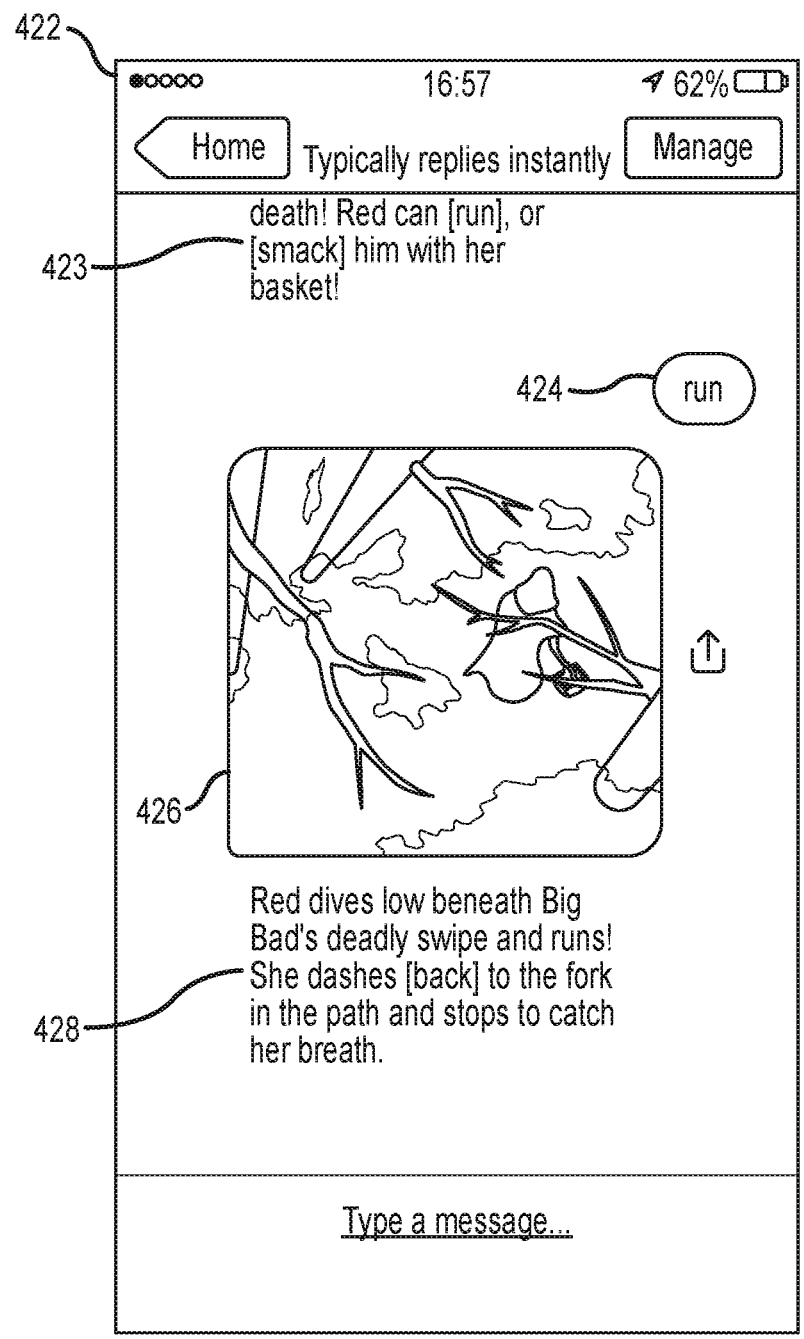
Figure 6:
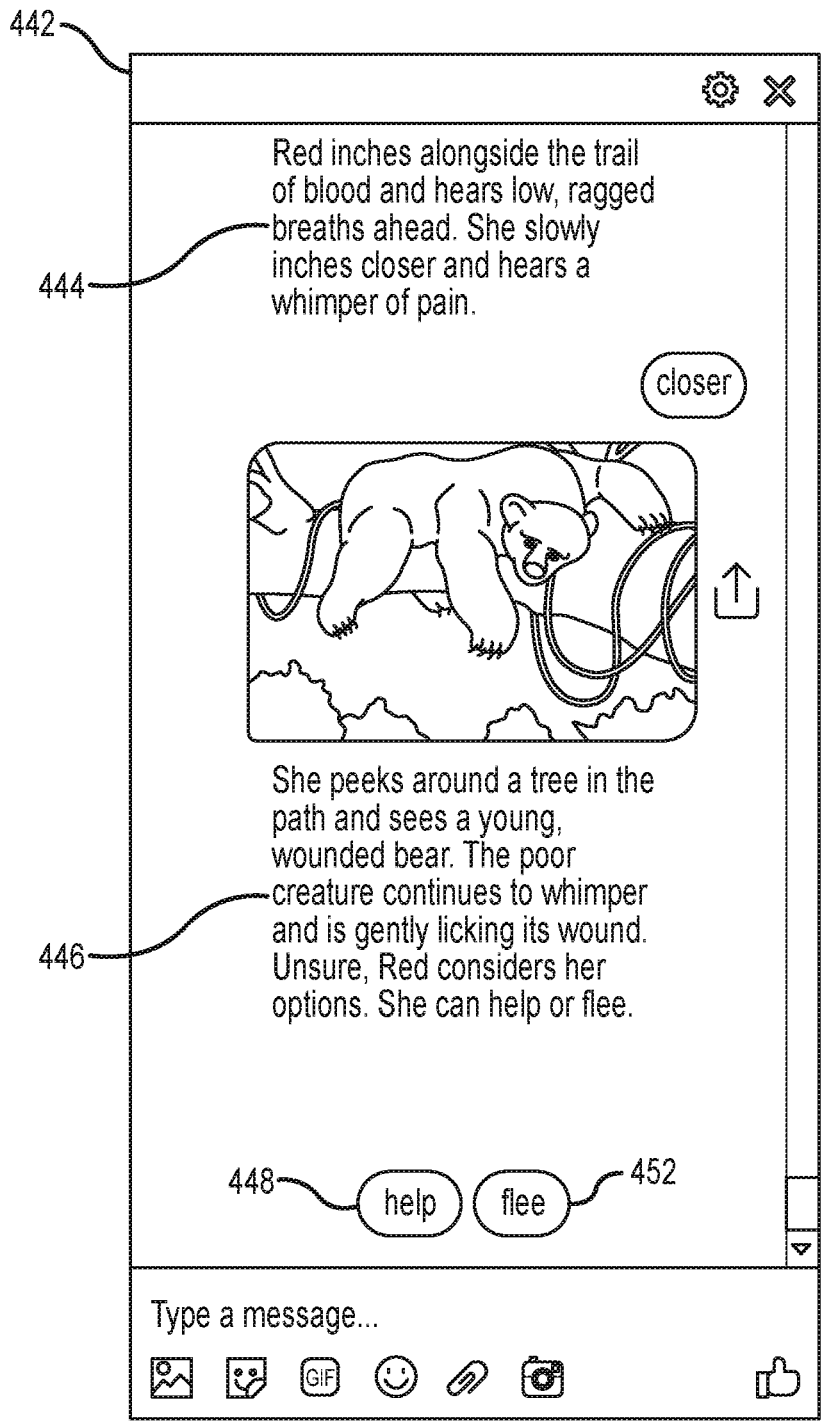

As explained above, the NCDS can be flexibly configured for compatibility with third party or off-the-shelf messaging applications. In this regard, FIGS. 4-6 depict screen shots associated with different messaging apps, wherein each screen shot includes a portion of the same narrative storyline.

Figure 4:
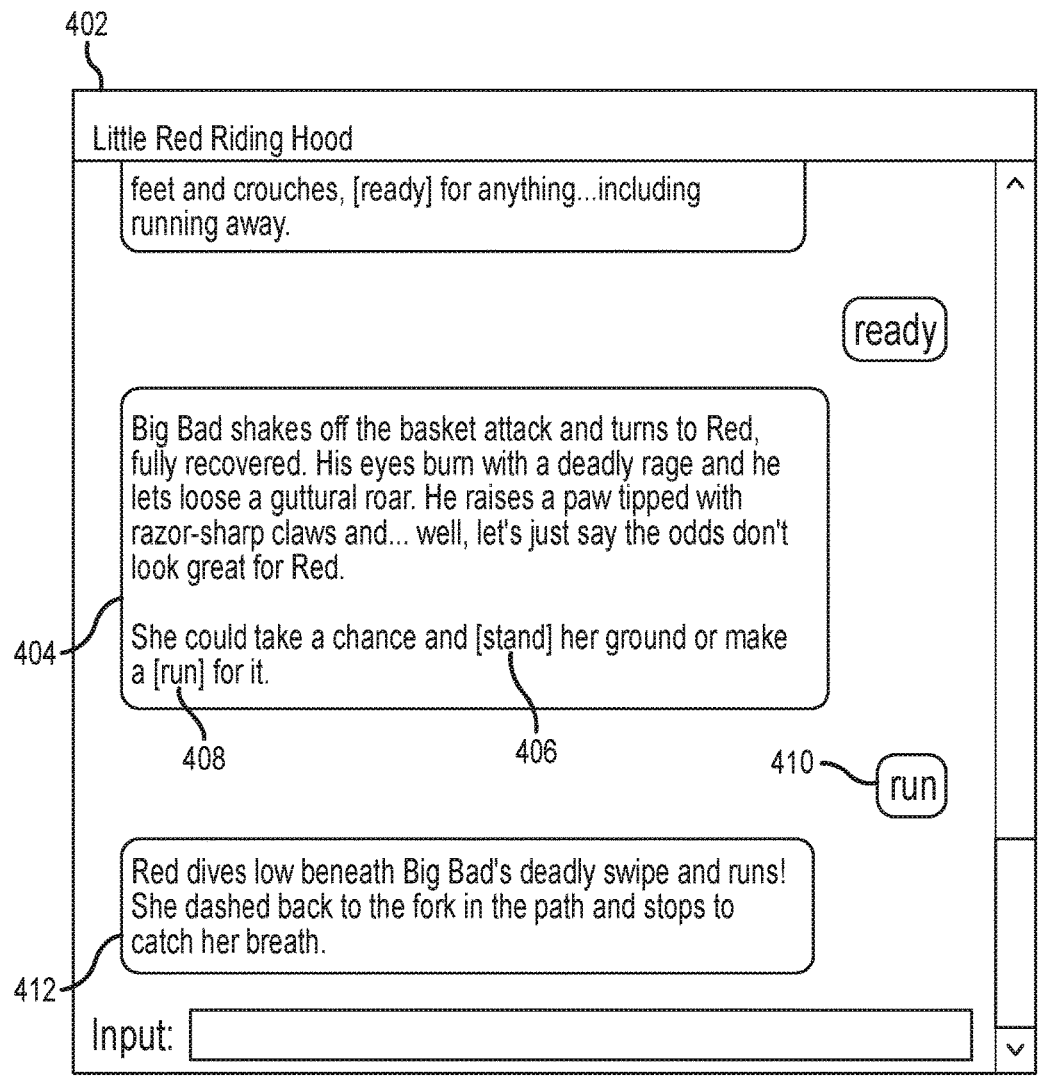
FIGS. 4-6 depict screen shots associated with different messaging apps, wherein each screen shot includes a portion of a narrative storyline.

The screen shot 402 depicted in FIG. 4 represents a simple text-based implementation where the narrative storyline messages include text (without any image, video, audio, or other content). The narrative storyline message 404 includes a readable passage related to the story titled "Little Red Riding Hood." The last sentence of the message 404 includes or conveys two different candidate storyline options 406, 408, which are surrounded by brackets to distinguish them from the remainder of the message 404. The first candidate storyline option 406 corresponds to the word "stand" and the second candidate storyline option 408 corresponds to the word "run" in the following sentence: She could take a chance and [stand] her ground or make a [run] for it. The user can choose either of the candidate storyline options 406, 408 to move the story forward. This example assumes that the user chooses the "run" option and sends a response message 410 that includes the word "run" as the user-specified storyline option. The illustrated embodiment assumes that only the word "run" is entered into the response message 410. In certain embodiments, however, the response message 410 can include additional information, as long as the NCDS is able to accurately identify and process the user-specified storyline option. The NCDS receives the response message, identifies the user-specified storyline option, retrieves the next storyline message (which is dictated by the identified option), and communicates the next storyline message to the subscriber device. FIG. 4 shows the next storyline message 412, which includes another portion of the current narrative storyline. Notably, the next storyline message 412 does not include any candidate storyline options (i.e., there is no bracketed text in the message 412). Thus, the current storyline may automatically continue after a designated period of time, or in response to a designated word or phrase entered by the user, such as "continue" or "next", or in response to a partial spelling of a designated word. To this end, the NCDS can be designed with intelligence to recognize typographical errors and/or incorrect user responses that suggest an intended response. In certain embodiments, the NCDS can leverage autocorrect, text prediction, translation, spelling correction, and/or other techniques and technologies if so desired.

In practice, the NCDS may employ a list of globally recognized commands, which can be entered by the user in response to a received message. These global commands can be entered whether or not a storyline message calls for an explicit choice. The global commands may include, without limitation: Exit; Pause; Resend Message; Go Back; Help; History; Restart; Library; and Menu.

The scenario described here assumes that the user-specified storyline option is actually one of the candidate storyline options conveyed in the received message. In other words, the selected option is valid and effective to move the story forward. The NCDS is suitably configured to detect and react to invalid, unintelligible, unknown, or erroneous user-specified storyline options. For example, the NCDS can return an error message or a warning if the user sends an invalid response message.

The screen shot 422 depicted in FIG. 5 includes the bottom portion of a storyline message 423 received at the subscriber device. This example assumes that the user chooses the "run" option and sends a response message 424 that includes the word "run" as the user-specified storyline option. Thus, the response message 424 includes a user-initiated reply to the communicated storyline message, which contains user-entered text for this particular example. The NCDS responds by sending the next storyline message to the subscriber device. FIG. 5 shows the next storyline message 426, which includes an image that can be displayed at the subscriber device. Although not always required, the image is preferably related somehow to the narrative storyline. In other words, images provided by the NCDS can serve as illustrations that are contextually associated with the narrative storyline. For this particular example, a subsequent storyline message 428 may include narrative text that progresses the story in a manner that is dictated by the "run" option selected by the user.

The screen shot 442 depicted in FIG. 6 includes the bottom portion of a previous narrative storyline message 444, and the entirety of a current narrative storyline message 446. FIG. 6 illustrates an embodiment that includes the user choices in a distinct area rather than integrated into the text of the message 446. Accordingly, the screen shot 442 includes two active elements that function as user-selectable buttons. One active element 448 corresponds to a first candidate storyline option, and another active element 452 corresponds to a second candidate storyline option. Selecting one of these active elements 448, 452 can automatically generate and send an appropriate response message, or automatically populate a response field to enable the user to send a text message that includes the selected storyline option.

The above examples illustrate different ways in which a user can reply to a narrative storyline message. The reply/response methodology can vary depending on the particular embodiment, the messaging service used, the subscriber device platform, the subscriber device app or feature that receives and presents the storyline messages, and/or user preferences. In this regard, the user can indicate his or her storyline choice using one or more of the following methodologies, without limitation: entering and sending text; selecting an active element (such as a displayed button, icon, or link); pressing a designated hotkey or button; entering a touch-sensitive gesture; speaking a voice command; selecting a directional arrow button or key; operating a joystick, mouse, or other type of pointing device; and shaking, moving, or orienting the subscriber device in a particular position. In practice, some of these user input methodologies and techniques can be natively supported by the stock messaging app of the subscriber device. In alternative implementations, a customized app or an app that is specifically written to support the NCDS can be utilized if needed to provide enhanced features and functions.

Figure 7:
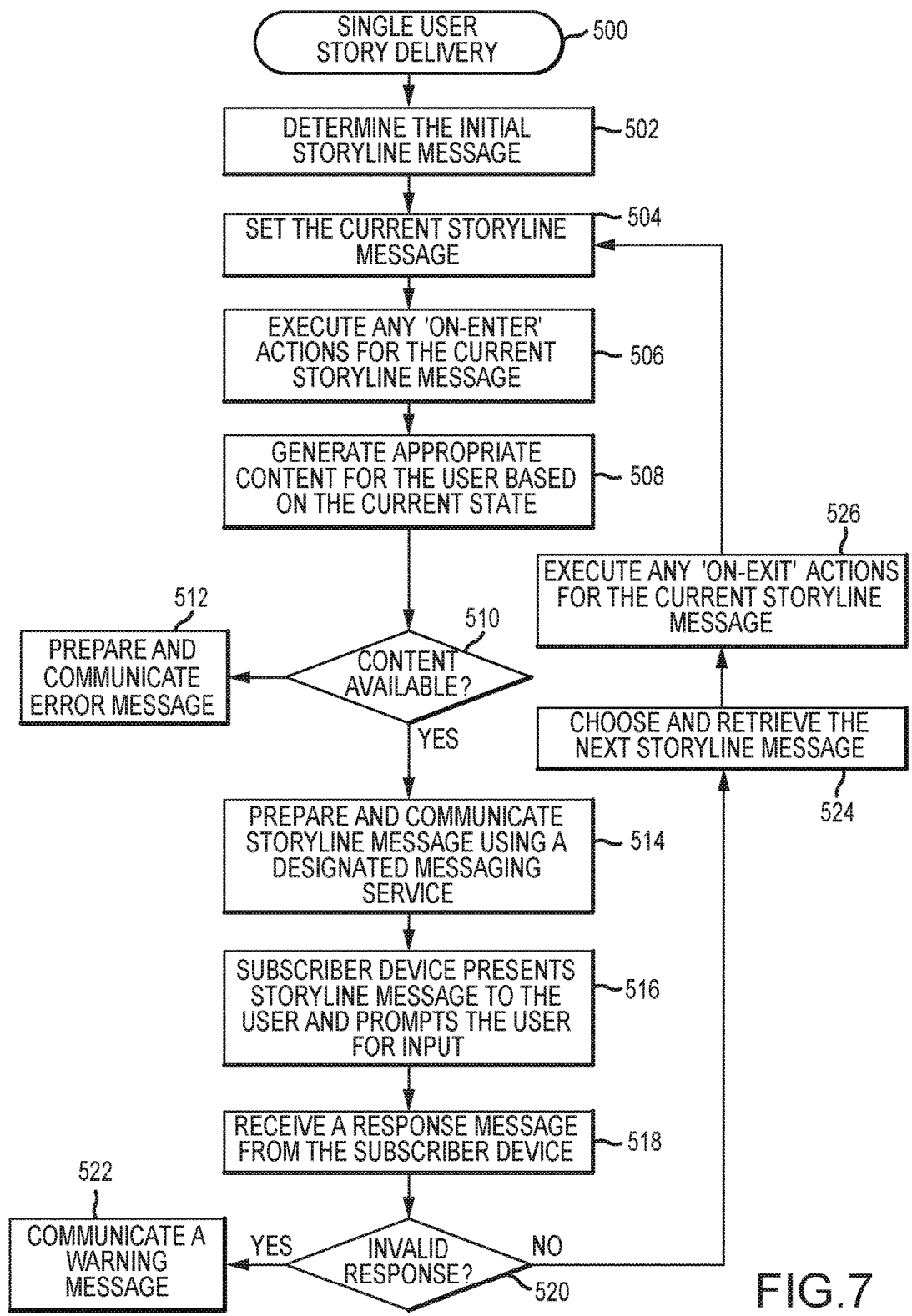
FIG. 7 is a flow chart that illustrates an exemplary embodiment of a single user story delivery process.
Figure 8:
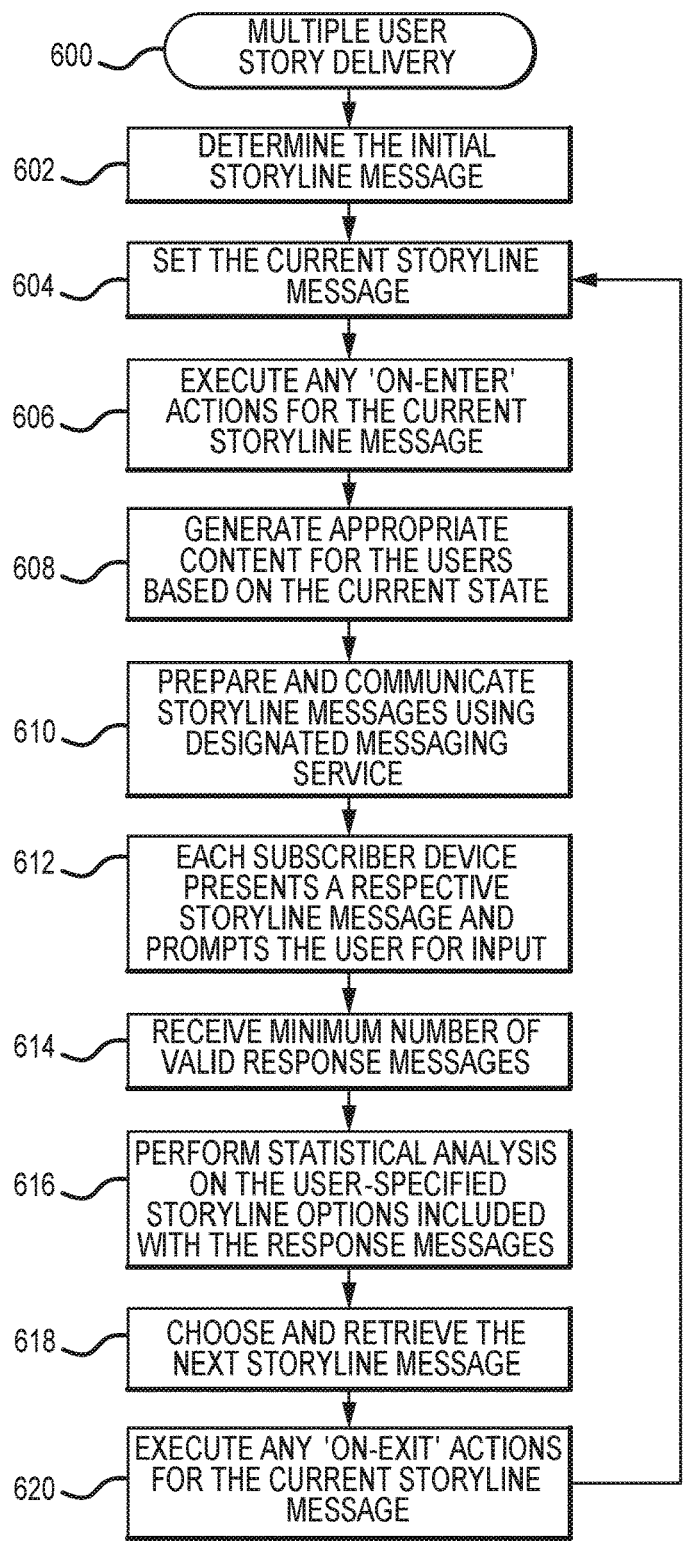
FIG. 8 is a flow chart that illustrates an exemplary embodiment of a multiple user story delivery process.

FIG. 7 is a flow chart that illustrates an exemplary embodiment of a single user story delivery process 500, and FIG. 8 is a flow chart that illustrates an exemplary embodiment of a multiple user story delivery process 600. The processes 500, 600 represent exemplary methods of delivering storyline content to users. The various tasks performed in connection with an illustrated process may be performed by software, hardware, firmware, or any combination thereof. In practice, portions of a described process may be performed by different elements of the NCDS, e.g., the server system, a messaging service, or a subscriber device. It should be appreciated that a described process may include any number of additional or alternative tasks, the tasks shown in a flow chart need not be performed in the illustrated order, and a described process may be incorporated into a more comprehensive procedure or process having additional functionality not described in detail herein. Moreover, one or more of the tasks shown in a flow chart could be omitted from an embodiment of the described process as long as the intended overall functionality remains intact.

The following description of the process 500 assumes that the user of the subscriber device is already registered with the NCDS, that the subscriber device includes a suitable app or native functionality that is compatible with at least one of the message-based services utilized by the NCDS, and that the user has already selected a story for delivery to the subscriber device. Moreover, this description assumes that the subscriber device communicates with a server system of the type described above, wherein the server system provides much of the described functionality and resources.

The illustrated embodiment of the process 500 begins by determining the initial narrative storyline message for the chosen story (task 502). Each story includes a defined starting point and a corresponding initial storyline message, and the server system can simply retrieve the initial message from the story database. The process 500 continues by setting the current storyline message to be delivered to the subscriber device (task 504). The initial narrative storyline message will be the current storyline message for the first iteration of task 504. For subsequent iterations of task 502, the server system can access the story database as needed to retrieve the next storyline message.

After setting the current storyline message at task 504, the process 500 executes any "on-enter" actions for the current storyline message (task 506). In this context, on-enter action are executed, and set their state, prior to the next passage being displayed. On-enter actions are executed in the background and, consequently, are invisible to the user. On-enter actions are utilized to modify, as the narrative advances, different states which can result in unique content being delivered based on the user choices. The results of on-enter actions need not be strictly server-side if users are permitted to consume content offline. If users cannot consume content offline, then the results of on-enter actions are held at the server side of the system. As one non-limiting examples of an on-enter action, assume that the current storyline message from the NCDS is "You can go through the [red] door or the [blue] door" and that the user responds with "red". At this point, an on-enter action is set while entering the next passage, which communicates that the user chose red. This results in the next storyline message: "You arrived via the red door". On-enter actions may also relate to "behind the scenes" actions that the user the user experiences (such as playing music or a sound). Accordingly, on-enter actions are actions such as saving a specific decision that the user has made, or setting a hidden variable for testing or use later in the interactive story, playing a sound, or the like.

The process 500 may continue by generating appropriate content for the user, based on the current state/status of the storyline as maintained by the server system (task 508). The content generated at task 508 can vary from message to message, depending on the current state/status of the storyline. The system generates the content via pre-written narratives. The system knows what to generate based on the various states being set in the story from the user's input. In this regard, the system chooses which content to provide by testing rules the content creator has placed on the content. For example, the generated content can be a narrative passage of text having no user choices associated therewith, or it can include image data, audio data, video data, an active link, active elements such as selectable buttons, or the like. If for some reason no content is available (the "No" branch of query task 510), then the process 500 continues by preparing and communicating an error message or warning that is intended for the subscriber device (task 512). The message may contain an explanation or a suggestion for a proper user response. Following task 512, the process 500 may wait for the next response message (see task 518), it may advance the story in an appropriate manner that disregards or anticipates a correct user response, or it may take other corrective action as needed.

This description assumes that suitable content is available (the "Yes" branch of query task 510). Thus, the process 500 continues by preparing and communicating a storyline message from the server system, using a designated messaging service that is supported by the subscriber device (task 514). The communicated storyline message is intended for the particular subscriber device operated by the user. Task 514 prepares the current storyline message based on the current state/status of the story, and based on the last-received response message issued by the user (if any). In this regard, the communicated storyline message includes the next portion or segment of the interactive narrative storyline, along with the content generated at task 508. The storyline message is prepared and generated in a format and arrangement that is appropriate for the designated messaging service and the subscriber device platform.

The NCDS may include or utilize an appropriate messaging service to package and send the current storyline message to the intended subscriber device, using one or more network links as needed. This description assumes that the current storyline message is successfully received by the intended subscriber device. Accordingly, the subscriber device operates to process and present the current storyline message to the user (task 516). Presentation of the current storyline message may involve the display of text, image, and/or video content, the playback of audio content, the rendering of animation, the display of active graphical user interface (GUI) elements, or the like. As mentioned previously, the current storyline message can prompt the user to provide input or feedback (by way of a response message), or the current storyline message can simply be a narrative passage that requires no user feedback or reply. For the latter scenario, the process 500 may automatically generate and send the next narrative storyline message after a designated period of time, in response to the user closing and opening the messaging app, or in response to any predetermined triggering criteria, which need not involve user activity at the subscriber device. Note that such triggering criteria can be different on each different form of messaging. For example, with the FACEBOOK MESSENGER platform, triggering criteria could be tied to a user becoming "active" again after a period of inactivity, wherein that specific type of triggering may not possible with other services or platforms, such as SMS. As another example, the triggering criteria could be associated with a voice command or instruction processed by a voice recognition enabled system or an interactive response service (e.g., the ALEXA control system, the CORTANA system, the SIRI system, or the like).

This example assumes that the current narrative storyline message prompts the user to make a choice. As explained above with reference to FIGS. 4-6, the storyline message may include bracketed text, active GUI elements, or highlighted text that identifies the candidate storyline options available to the user. In a free-roam implementation, the current storyline message need not include any indication or user prompt. In this regard, the user must determine how best to respond, and what text (if any) to send in the next reply. Regardless of the particular implementation, the subscriber device is controlled and operated in an appropriate manner to send an appropriate response message, wherein the response message is intended for the messaging service and/or the server system. Although not always required, this description assumes that the response message includes at least one user-specified storyline option. In other words, at least some of the content of the response message is based on a user-entered choice, a user-selected button, a user-designated command, or the like. In certain embodiments, the user-specified storyline option identifies a user selection that corresponds to user interaction with the current narrative storyline message, e.g., activation of a hyperlink, activation of a GUI button, initiating playback of a media file, or viewing an image. In other embodiments, the user-specified storyline option includes user-entered characters that correspond to highlighted or bracketed text contained in the current narrative storyline message.

Absent any data communication errors, the server system receives the response message (task 518). Notably, the received response message is generated by the subscriber device in response to the previously communicated narrative storyline message. The process 500 analyzes the content of the response message to determine whether the received message includes a valid or invalid user-specified storyline option (query task 520). In this regard, the server system can compare the content of the response message against the relevant story data that relates to the current state/status of the storyline. If the received response message contains content that matches (or closely resembles) one of the known candidate storyline options, then the process 500 determines that the response message is valid and the "No" branch of query task 520 is followed. Conversely, if the process 500 cannot link the content of the received response message to any of the known candidate storyline options, then the response message is deemed invalid and the "Yes" branch of query task 520 is followed. If the process 500 detects an invalid user-specified storyline option, then the server system generates a suitably formatted warning message that is intended for the subscriber device (task 522). The warning message may contain appropriate text or media content to notify the user about the invalid response, and to prompt the user to try again. The process 500 may also resend the previous narrative storyline message with the warning message (or following the warning message) to reestablish the current state of the storyline.

This description assumes that the response message contains a valid user-specified storyline option. Accordingly, the process 500 continues by choosing and retrieving the next storyline message, which contains the subsequent portion of the interactive narrative storyline (task 524). The determination and identification of the next storyline message is dictated by the user-specified storyline option received with the response message. The server system can perform task 524 by consulting the stored storyline data, which defines how the story branches at each decision point based on the particular option chosen by the user.

After selecting the next storyline message based on the input received from the user, the process 500 executes any "on-exit" actions for the current/last storyline message (task 526). In this context, an "on-exit action" is similar to an "on-enter" action (described above), except that on-exit actions occur when leaving a story segment or section. On-exit actions can be behind-the-scenes variables set without user knowledge, or playing sounds or rendering visual content that can be experienced by the user. In accordance with one non-limiting example, assume that the NCDS sends the following storyline message: "Dave quickly seals his space suit and desperately looks up at the display. He only has a moment left before decompression, does he take the [toolkit] or the [diagnostic] device?" and that the user responds with "toolkit". For this example, because both options lead to Dave getting sucked out into space from decompression, an on-exit event sets a variable "decompression" to TRUE. Note that on-exit events are called regardless of which decision the user makes, whereas on-enter events are associated with specific user decisions.

At this point, the state/status of the story has been updated, and the process 500 returns to task 504 to set the next storyline message (obtained at task 524) as the current storyline message, and to eventually communicate the next storyline message to the subscriber device. Thereafter, the process 500 continues as described above in an ongoing manner until the user reaches the end of the chapter, the end of the story, or the like. The NCDS is designed such that previous user responses are remembered (as needed) such that subsequent storyline messages remain consistent and accurate with the current state/status of the story, and such that subsequent storyline message do not contain redundant, confusing, or unnecessary user choices. For example, if a previous user response contained "Open Window", then the NCDS will save the window state as "open" and subsequent storyline messages will be generated in an appropriate manner.

In certain embodiments, the server system regulates the timing of communicating the next storyline message based on timing criteria. For example, delivery of narrative storyline messages can be regulated based on user availability data for the user of the particular subscriber device. Such user availability data may include any of the following, without limitation: historical usage data associated with user interaction with previous interactive narrative storylines; calendar data associated with the user; user-specified status data (e.g., "do not disturb" or "busy" or "driving" or "free"); device status information of the subscriber device; or geographical location data associated with the subscriber device. The device status information can include camera data, voice-recognition data, device orientation data, etc. The device status information allows the system to consider things such as: whether the user is actually looking at the device, whether the user has placed the device into a pocket or a purse (if so, stop sending messages), and the like. Alternatively or additionally, the timing criteria can consider the current state/status of the story to enhance the emotional experience of the user. Thus, the delivery of storyline messages can be delayed or expedited as needed to reduce the frequency of device notifications, to increase the likelihood of user participation, to adjust the feeling of suspense, or the like. Alternatively or additionally, the timing of storyline messages can be adjusted to accommodate the delivery of advertisements, marketing literature, coupons, news reports, or other content to the subscribers.

In certain exemplary embodiments, the NCDS allows the user to backtrack and make alternative choices to change the outcome of the current narrative storyline. This feature can be implemented using a devoted "Go Back" button and/or it can be initiated by entering "Go Back" or "Undo" as a reply message. In accordance with one option, the NCDS allows the user to back track at any point in the story, and it does not limit how far the user can go back. In alternative implementations, the NCDS can limit the number of sequential back tracking steps and/or it can restrict the ability to back track such that certain critical decision points cannot be undone.

Referring now to FIG. 8, the multiple user story delivery process 600 is similar to the process 500 in many respects. The process 600, however, involves the delivery of storyline messages to a plurality of different users and the collection and handling of multiple responses messages associated with the decision points in the story. Some of the features, tasks, and functionality of the process 600 are identical or equivalent to that described above in the context of the process 500, and common aspects will not be redundantly described in detail below.

The process 600 determines the initial narrative storyline message (task 602), sets the current storyline message (task 604), executes applicable "on-enter" actions for the current storyline message (task 606), and generates the appropriate content for the different users, based on the current state/status of the story (task 608). Although not always required, the initial storyline message will usually be the same for each user. Thus, the current storyline message for the first iteration of task 604 will usually be the same for each user. Depending on the particular story, the number of users, and the progression complexity of the story, the process 600 can generate and send any number of storyline messages to the different subscriber devices in parallel. For example, the NCDS can support alternative storyline branches that accommodate different user choices such that a plurality of parallel paths are followed by different users. The parallel paths may eventually converge at a common decision point to "align" the storyline among all users, or multiple paths with divergent endings can be supported. These and other scenarios are contemplated by this description. Nonetheless, for simplicity, the following description of the process 600 assumes that the storyline progresses along a common path for all users and all subscriber devices.

The process 600 may continue by generating appropriate content for the users, based on the current state/status of the storyline as maintained by the server system (task 608). The content generated at task 608 can vary from message to message, depending on the current state/status of the storyline. Moreover, the content generated at task 608 may be influenced by the different subscriber device platforms and/or the different messaging services or platforms used by the subscriber devices. In other words, although the primary storyline content may be the same for all users, the content of each storyline message can be enhanced, formatted, or customized for compatibility with the different subscriber devices.

The process 600 continues by preparing and communicating the storyline messages to the subscriber devices assigned to a plurality of different users, via one or more messaging services (task 610). This description assumes that each subscriber device successfully receives a current storyline message and that each subscriber device presents the received message to the respective user (task 612). This example also assumes that the current storyline message calls for a user response, decision, choice, or selection. The server system receives response messages generated from at least two of the subscriber devices, wherein each received response message includes a respective user-specified storyline option selected by the particular user. Ideally, the server system will receive a valid response message from each participating user. In practice, however, the server system can proceed after receiving at least a minimum number of valid response messages (task 614). Alternatively or additionally, the server system can proceed after a specified period of time has elapsed, regardless of how may valid response messages are received.

Each of the received response messages (assuming that they are valid) includes or identifies one of the possible candidate storyline options. The process 600 continues by collecting the storyline options identified in the response messages and performing an appropriate statistical analysis on those storyline options (task 616). The statistical analysis performed at task 616 can be relatively simple or relatively complex, as appropriate to the particular embodiment. For example, task 616 can tally the identified storyline options and choose and retrieve the next storyline message (task 618) based on the storyline option having the highest count. The process 600 may implement a weighted scoring scheme, a tiebreaker methodology, or any suitable algorithm to determine which storyline option will be utilized for purposes of setting the next narrative storyline message to be delivered to the users. In this way, the next storyline message retrieved by the server system is based on the set of response messages received from at least some of the subscriber devices.

The NCDS can support other features and functions that enhance the multiuser experience. For example, the NCDS can send reminders to encourage users to respond to a storyline message that requires a decision. As another example, the NCDS may allow the multiple users to communicate with one another, review response statistics, or the like. The following is an example of an exemplary multiuser story flow, which demonstrates one particular multiple user story delivery scenario.

Justin initiates a 1-4 participant story (titled Epic Journey) from his mobile app, and decides to invite his friends Holly and Terry to join. Justin logs in with his FACEBOOK social media account and uses his friends list to send Holly an invitation. Justin decides to email Terry an invitation, and then initiates the two invites. Justin's mobile app confirms a few different settings with Justin: (1) how long to wait before beginning the story; (2) the minimum number of participants needed before beginning the story; and (3) whether he wants a notification 15 minutes before the story begins, to confirm his preferences. In response to these prompts, Justin enters the following: (1) one hour; (2) one participant; (3) yes, send a notification.

Holly receives a notification on her phone through the FACEBOOK social media platform. Holly is already a registered user of the NCDS and, therefore, she simply logs into her mobile app and accepts Justin's invitation. The story Epic Journey is now added to Holly's library under the "multiplayer" section. Although Holly can participate in the story, she cannot initiate her own set of invites because she does not "own" the story yet. Holly selects "Epic Journey" to begin the story. She reaches the invite screen, which informs her that Terry hasn't accepted yet. She then uses the story chat feature and sends a message asking why Terry hasn't joined. Justin replies that Terry is still at work, and that he will probably accept the invitation when he is available.

Terry is sent an email with instructions on how to accept the shared story, register with the NCDS, and download the associated mobile app. Terry views the invitation email on his phone, follows the embedded links, sets up an account, and downloads the mobile app. Fifteen minutes before the story begins, Justin receives a notification that confirms all invited parties have accepted, and the story is ready. Justin begins reading through the story, which may be delivered in one or more narrative storyline messages. Holly reads through the story at her own pace as well.

Eventually, Terry closes out of his mobile app and leaves the story. Meanwhile, Justin and Holly have each reached the narrative's first decision point on their own. At this point, the group must choose between going to an island or traveling to a town: Justin chooses the island, and Holly chooses the town. After receiving the two response messages, the server system causes the narrative storyline to enter a pending choice state, and a one-hour response timer is set. Justin and Holly can both click on the decision screen and see that Terry has not yet responded. Thereafter, Justin sends Terry a text letting him know that he has only fifteen minutes left to make a choice in the story. Terry sees Justin's text and a notification on his phone reminding him that the Epic Journey story has reached a decision point. If Terry does not respond before the deadline, the mobile app (or the server system) will randomly choose an option for him. Terry decides to log into the mobile app, and he reads the storyline to catch up. Once he reaches the decision point, he can immediately respond or click on the decision screen to see the current voting results.

Terry activates the chat feature and says that he is undecided at this time. Holly reminds Terry that she is his boss, and convinces Terry to select the "go to the town" option. The NCDS responds to the final voting results (the town option) by retrieving the next narrative storyline message and sending it to the three users. The group continues on their way through the narrative until they reach the end of the current chapter. At this point Holly and Terry are prompted by the mobile app to purchase the content so that they can record their response statistics in their own account profiles. Otherwise, they are able to continue reading through the story, but their decisions will not be recorded by the server system in connection with their user profiles.

In accordance with certain embodiments of the NCDS, the server system maintains user profile and status information and updates the information in an ongoing manner as stories play out. To this end, the server system includes or cooperates with a database that includes user profile information. The database may include a choice profile database object for each subscriber, and the choice profile database objects include dynamically updateable user profile data. The user profile data can include or define the behavioral or personality traits, attributes, habits, or tendencies of the user.

The decisions and choices made by each user during the course of a narrative storyline can be captured, saved, and analyzed in any desirable fashion to characterize tendencies, traits, habits, and decision-making behavior of the users. For example, the NCDS can create a group of traits which can be used to track subscriber choices on an account, story, and chapter level basis. The traits and user profile information can be utilized to deliver a personalized profile type for each user, thereby increasing subscriber attachment to their account. The NCDS can also support delivery of a breakdown of decisions on a macro and micro level to give statistics-tracking readers more information to digest, as well as encourage rereads of already purchased content to increase service retention.

In the context of the NCDS, a trait represents a data point that records the moral implications of choosing a particular option or path in a narrative story. To this end, traits should be broad enough to encompass multiple situations and genres, yet specific enough to support an individualized choice profile. For the exemplary embodiment presented here, each trait is characterized by two opposing sides or ends of a spectrum (referred to herein as "aspects" or "attributes"). Any number of traits, with corresponding aspects, can be supported by an embodiment of the NCDS. This particular example maintains and updates three traits for each user: the attitude trait; the analysis trait; and the approach trait. The attitude trait is associated with the extrovert aspect and the introvert aspect, the analysis trait is associated with the logic aspect and the emotion aspect, and the approach trait is associated with the structured aspect and the spontaneous aspect.

The attitude trait represents the subscriber's general approach to social situations and world interactions within their stories. The extrovert aspect (of the attitude trait) can be used for choices that relate to spending one's energy on the outer world, other people, and things. The introvert aspect (of the attitude trait) can be used for choices that relate to spending one's energy on internal ideas, with more focus on their own inner world. The analysis trait relates to how the subscriber goes about processing information, and how they approach weighing options. The logic aspect (of the analysis trait) can be used for choices that represent an objective analysis of the facts associated with an option. The emotion aspect (of the analysis trait) can be used for choices that represent more of a subjective people-oriented approach to an option, taking into account the desires of those involved even if they run contrary to the facts. The approach trait can be utilized for situations within a story that reflect general task-oriented decisions. It also can also be used for split-second action decisions, and how strongly the reader tends toward multitasking. The structured aspect (of the approach trait) can be used for choices that represent conservative or careful planning and a single-mindedness in purpose. The spontaneous aspect (of the approach trait) can be used for choices that represent a more flexible or wild approach, with less focus on a single task and a tendency to "go with the flow" in a less disciplined manner.

Over time, the NCDS will determine which aspects are dominant for each subscriber. For the three-trait example described here, each subscriber can be characterized by a particular combination of three aspects (one aspect taken from each of the three traits of interest). Accordingly, the various combinations of trait aspects can result in eight different "decision profile" types. These decision profile types are labeled and defined as follows:

Director (Extrovert+Logic+Structured)—You are bold and imaginative, and always find a way to accomplish your goals.

Pioneer (Extrovert+Logic+Spontaneous)—You are energetic and extremely perceptive, and truly enjoy living on the edge.

Performer (Extrovert+Emotion+Spontaneous)—You are spontaneous and energetic, and enthusiastically embrace all life around you.

Architect (Introvert+Logic+Structured)—You are clever and strategic, with a plan for every possible outcome.

Executive (Introvert+Logic+Spontaneous)—You are an excellent organizer, unsurpassed at managing things and handling the unexpected.

Visionary (Introvert+Emotion+Spontaneous)—You are astute and curious, and cannot resist an intellectual challenge.

Counselor (Extrovert+Emotion+Structured)—You are quiet and mysterious, and a tirelessly inspirational idealist.

Guardian (Introvert+Emotion+Structured)—You are a dedicated and warm protector, always ready to defend what you care for.

These decision profile types and their corresponding definitions are merely exemplary. In practice, an embodiment of the NCDS can define and employ any desired combination of profile types, which in turn can be influenced by the particular personality traits and associated attributes contemplated by the NCDS.

Traits and aspects are utilized in a narrative storyline by associating them with corresponding storyline choices. When a user chooses an option having a particular aspect "value" or "score" or "flag" attached to it, the corresponding data is recorded in their user profile or account. Moreover, the scoring algorithm can be designed to give more or less weight to certain choices and/or to certain decision points. For example, some decision points in a story may be considered to be very critical or highly indicative of personality traits, ethical tendencies, or the like, while other decision points may be designated to be of lesser importance. The user's profile can utilize this information to develop a particular decision profile type for the user. Note that the authors (storyline creators) can attach more than one trait aspect to an option should it be appropriate to the decision, provided that the aspects do not belong to the same trait. A user's aspect scores can be updated in an ongoing manner, after the completion of a storyline, at the end of each chapter, after a predefined number of choices have been made, or the like. The example presented here adjusts aspect scores at the end of each chapter.

The particular scoring mechanism and algorithm utilized by the NCDS can vary from one embodiment to another if so desired. For the exemplary embodiment described here, trait scores begin at zero and can increase to 1,000 points in either direction toward each aspect on a single continuum. Zero can be considered the midpoint of a sliding scale. For example, the approach trait is associated with a scoring range of Structured=1,000 to Spontaneous=1,000, with a value of zero indicating an approach trait that is neither structured nor spontaneous. Each chapter of a story can contribute up to ten points per trait, and the trait scores can be rounded or truncated if so desired.

Scoring out the trait-tagged decisions from a chapter can be performed by calculating what percentage of each trait was devoted to each aspect of a trait, multiplying the resulting number by ten, and then subtracting the smaller value from the larger value to determine which trait has gained scoring. Although the scoring can be calculated using a variety of different techniques, the exemplary embodiment utilizes the following equation:

((Larger # of Aspect Decisions/Total Trait Decisions)*10)less((Smaller # of Aspect Decisions/Total Trait Decisions)*10)=Score to add to Larger Aspect Example There are 14 links or choices tagged with the analysis trait in a chapter, and each of those tagged choices is identified as being either a "logic" choice or an "emotion" choice for purposes of aspect scoring. For this chapter, the subscriber made five logic choices, and nine emotion choices. In accordance with the exemplary methodology presented herein: (9/14)=0.64, which means that 64% of the analysis-related decisions were based on the emotion aspect. (5/14)= 0.36, which means that 36% of the analysis-related decisions were based on the logic aspect. When multiplied by ten, the results are a 6.4 score for the emotion aspect, and a 3.6 score for the logic aspect. In accordance with the defined subtraction operation, 6.4−3.6=2.8. Accordingly, 2.8 is the resulting chapter score for the emotion aspect, and at the end of the chapter the NCDS adjusts the analysis trait value by 2.8 points toward the emotion side.

Aspects can have different defined intensity levels depending on what score the customer reaches on the 1000-0-1000 scale. These levels can have corresponding descriptions, and achieving different levels can unlock related badges or other features or benefits on the subscriber's account. The embodiment described here includes four different levels per aspect. As an example, the following levels are available for the logic aspect of the analysis trait:

Analysis Logic I (0-250): You rely on your emotional instincts almost as much as your ability to analyze things objectively. But when push comes to shove, you fall back on the facts to make a decision.

Analysis Logic II (251-500): While you'll indulge a hunch when it seems relatively grounded, you more often tend to rely on the facts above instincts and feelings.

Analysis Logic III (501-750): Facts and reason are your allies when it comes to understanding the world around you. Strong emotions can still influence your interpretations, but overall you are steadfast in your conviction that logic is truth.

Analysis Logic IV (751-1000): Emotions and subjectivity have no place in your mental toolkit when it comes to understanding the world around you. The cold hard facts are all that matters.

As with the aspects, the profile types may also have different levels depending on what score the subscriber has obtained within their contributing aspects (akin to a meta-intensity check on top of the aspects). To reach a level in a specific profile type, the subscriber needs to bring each of the corresponding aspects to the designated level. The embodiment described here includes four different levels for each profile type. As an example, the following levels are available for the Director profile type, which was summarized above:

Novice Director (Requires Extrovert, Logic, and Structured aspects all at Intensity Level I): You occasionally are outspoken and have a strong desire to forge your own path. You seek to accomplish your goals, but often follow the rules when doing so.

Associate Director (Requires Extrovert, Logic, and Structured all at Intensity Level II): You often speak your mind and will strike out on your own if it seems more efficient. Accomplishing your goals is important, and you might even bend the rules to make them happen.

Senior Director III (Requires Extrovert, Logic, and Structured all at Intensity Level III): More often than not you'll voice your opinion, regardless of who the audience is. You goals are extremely important to you. The ends typically justify the means.

Master Director (Requires Extrovert, Logic, and Structured all at Intensity Level IV): Speaking your mind is second nature, whether it's the right forum or not is irrelevant. You'll achieve your goals at all costs and flatten those who oppose you.

Due to the branching nature of the narrative stories, it is likely that subscribers will read through content multiple times. To accommodate multiple re-reads, the breakdown of trait scores should be recorded separately for each re-read of a chapter. However, only scores from the most recently completed reading of a chapter will count toward the account's choice profile type. This will prevent users from reading the same content over and over again in an attempt to max out a trait score.

The NCDS can also maintain a Books to Trait Max Ratio (BTM Ratio), which is a formula to calculate the number of complete stories it would take a subscriber to reach the maximum level in any one single trait aspect. Note that this formula assumes that the subscriber consistently makes choices which contribute to one trait aspect. Users who are less consistent will take more time; the greater the inconsistency the greater the time to reach the maximum (if it happens at all). One exemplary methodology is as follows:

Max Trait Points per Chapter: 10
Average Chapters per Book: 8
Average Trait Points per Book: 80
Total Trait Score to Max: 1000
BTM Ratio (Total Trait Score to Max/Average Trait Points per Book): 12.5 Books (or 100 Chapters)

When a user restarts a chapter they have already read, they should be given a notification that upon completion the scores from their most recent reading will erase the previous reading's scores. At this point they have the option to either proceed with their reread or decline to begin it.

Figure 9:
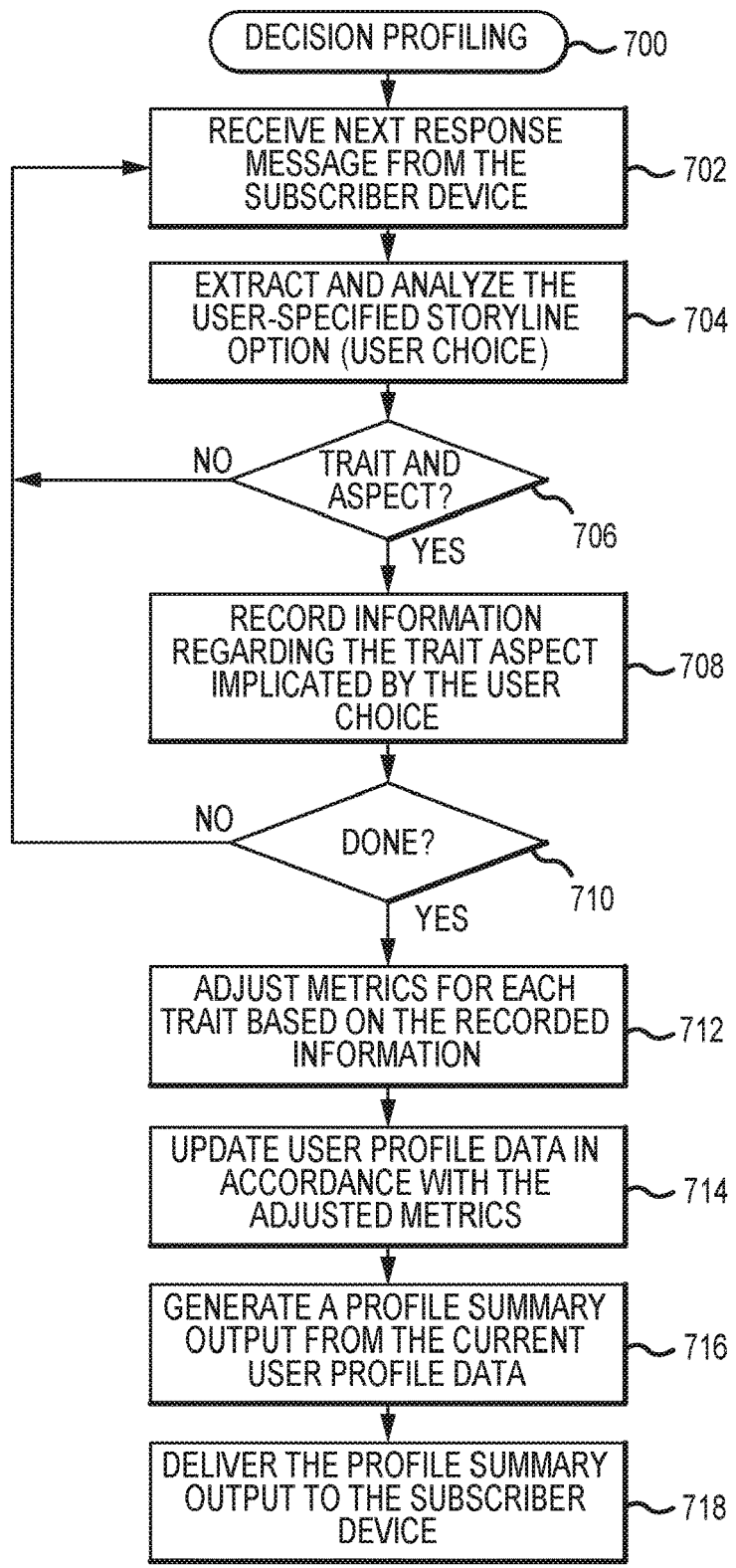
FIG. 9 is a flow chart that illustrates an exemplary embodiment of a decision profiling process.

FIG. 9 is a flow chart that illustrates an exemplary embodiment of a decision profiling process 700, which may be performed by the NCDS described above. The process 700 can be performed in conjunction with the single user story delivery process 500 and in conjunction with the multiple user story delivery process 600. This description assumes that the NCDS includes or cooperates with a suitably configured database having choice profile database objects for the subscribers, as described above. The database objects include dynamically updateable user profile data corresponding to the trait aspect scores for the subscribers.

For the illustrated embodiment, the decision profiling process 700 receives a response message from the subscriber device (task 702) and extracts and analyzes the user-specified storyline option (i.e., the user choice) from the response message (task 704). As mentioned above, certain choices are tagged with trait and aspect information, and other choices are void of such information. Accordingly, the process 700 checks whether the user choice includes trait and aspect information (query task 706). If not, then the process 700 exits and returns to task 702 at an appropriate time to consider the next response message (if any). This description assumes that the user choice conveyed in the received response message includes trait and aspect information (the "Yes" branch of query task 706). Accordingly, the server system records information regarding the trait aspect that is implicated by the user choice (task 708). For example, the server system can save the aspect type (Extrovert, Introvert, Logic, Emotion, Structured, or Spontaneous) and a score, value, or metric associated with the user choice. In accordance with the methodology outlined above, the server system keeps a simple count for each aspect type, and the counts are processed at the end of each chapter.

The process 700 can continue receiving response messages and recording the trait aspect information for any desired amount of time, for any number of response messages, or for any portion of the story. In this regard, the process 700 can return to task 702 (the "No" branch of query task 710) any number of times to collect additional trait aspect data. This example assumes that the trait aspect data is collected and saved for analysis at the end of each chapter. Thus, if the process 700 is done collecting the trait aspect information (the "Yes" branch of query task 710), then the server system can adjust the metrics or score for each trait based on the recorded information (task 712). In this way, the server system can update the user profile data over time, in accordance with the adjusted metrics or scores (task 714). The updated user profile data will therefore be influenced by at least some of the response messages received by the server system for the particular user.

The updated/current user profile data can be used to generate a profile summary output for the user (task 716). The profile summary output may include any of the following information, without limitation: statistics related to the choices made by the user; the current scores or values for each trait (based on the 0-1000 scale mentioned above); the level reached for each trait aspect; the current decision profile type of the user; and the particular level of the profile type. The process 700 continues by delivering, communicating, or otherwise presenting the profile summary output to the subscriber device (task 718) such that the subscriber can view the output. In certain embodiments, the profile summary output is made available on the user's profile page, which is accessible via the NCDS application that resides on the subscriber device.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of delivering storyline content to users, the method comprising:
maintaining, by a server system, storyline data corresponding to an interactive narrative storyline comprising variable narrative paths that influence at least one outcome of the interactive narrative storyline;
communicating a storyline message from the server system using a messaging service, the communicated storyline message intended for a subscriber device, and the communicated storyline message comprising a portion of the interactive narrative storyline;
receiving, by the server system, a response message generated from the subscriber device in response to the communicated storyline message, the response message comprising a user-specified storyline option, wherein each storyline option of the interactive narrative storyline has at least one trait aspect score associated therewith;
retrieving, by the server system, a next storyline message comprising a subsequent portion of the interactive narrative storyline, the retrieving dictated by the user-specified storyline option;
after the retrieving, communicating the next storyline message from the server system using the messaging service, the communicated next storyline message intended for the subscriber device;
maintaining, by the server system, a choice profile database object for a user of the subscriber device, the choice profile database object including dynamically updateable user profile data that is indicative of behavioral and personality traits, attributes, or tendencies of the user, wherein a plurality of defined traits with corresponding trait aspects are maintained with the profile data for the user;
updating the user profile data over time in accordance with response messages received by the server system in association with the user, and in accordance with trait aspect scores associated with the response messages;
generating a profile summary output from current user profile data;
delivering the profile summary output to the subscriber device;
determining dominant trait aspects for the user for each of the plurality of defined traits, based on the current user profile data;
identifying a decision profile type of the user, based on a combination of the dominant trait aspects determined for the user; and
unlocking features or benefits for the user according to trait aspect levels reached by the user.

2. The method of claim 1, wherein the response message comprises a user-initiated reply to the communicated storyline message.

3. The method of claim 1, wherein the user-specified storyline option comprises user-entered text.

4. The method of claim 1, wherein the user-specified storyline option identifies a user selection corresponding to user interaction with the communicated storyline message.

5. The method of claim 1, wherein the communicated storyline message conveys a plurality of candidate storyline options that includes the user-specified storyline option.

6. The method of claim 1, wherein the messaging service comprises a text messaging service, an instant messaging service, an email service, an interactive response service, or a social media application.

7. The method of claim 1, wherein:
the communicating step communicates the storyline message to a plurality of subscriber devices assigned to a plurality of different users;
the receiving step receives response messages generated from at least two of the plurality of subscriber devices, each of the received response messages comprising a respective user-specified storyline option; and
the next storyline message retrieved by the retrieving step is based on the plurality of response messages received.

8. The method of claim 7, wherein:
the communicated storyline message conveys a plurality of candidate storyline options;
each of the received response messages identifies one of the plurality of candidate storyline options, resulting in a plurality of identified candidate storyline options;
the method further comprises the step of performing a statistical analysis on the plurality of identified candidate storyline options; and
the next storyline message retrieved by the retrieving step is a result of the statistical analysis.

9. The method of claim 1, further comprising the step of regulating timing of communicating the next storyline message based on user availability data for a user of the subscriber device.

10. The method of claim 9, wherein the user availability data comprises historical usage data associated with user interaction with previous interactive narrative storylines, calendar data associated with the user, user-specified status data, device status information of the subscriber device, or geographical location data associated with the subscriber device.

11. The method of claim 1, further comprising:
determining, by the server system, that the received response message comprises an invalid user-specified storyline option; and
in response to the determining, communicating a warning message from the server system using the messaging service, the communicated warning message intended for the subscriber device.

12. A computer-based server system comprising a memory element and a processor device communicatively coupled to the memory element, the memory element having computer-executable instructions stored thereon and configurable to be executed by the processor to cause the server system to:
maintain storyline data corresponding to an interactive narrative storyline comprising variable narrative paths that influence at least one outcome of the interactive narrative storyline;
communicate a storyline message using a messaging service, the communicated storyline message intended for a subscriber device, and the communicated storyline message comprising a portion of the interactive narrative storyline;
receive a response message generated from the subscriber device in response to the communicated storyline message, the response message comprising a user-specified storyline option, wherein each storyline option of the interactive narrative storyline has at least one trait aspect score associated therewith;
retrieve a next storyline message comprising a subsequent portion of the interactive narrative storyline, the retrieving dictated by the user-specified storyline option;
after retrieving the next storyline message, communicate the next storyline message using the messaging service, the communicated next storyline message intended for the subscriber device;
maintain a choice profile database object for a user of the subscriber device, the choice profile database object including dynamically updateable user profile data that is indicative of behavioral and personality traits, attributes, or tendencies of the user, wherein a plurality of defined traits with corresponding trait aspects are maintained with the profile data for the user;
update the user profile data over time in accordance with response messages received by the server system in association with the user, and in accordance with trait aspect scores associated with the response messages;
generate a profile summary output from current user profile data;
deliver the profile summary output to the subscriber device;
determine dominant trait aspects for the user for each of the plurality of defined traits, based on the current user profile data;
identify a decision profile type of the user, based on a combination of the dominant trait aspects determined for the user; and
unlock features or benefits for the user according to trait aspect levels reached by the user.

13. The server system of claim 12, wherein the communicated storyline message conveys a plurality of candidate storyline options that includes the user-specified storyline option.

14. The server system of claim 12, wherein:
- the server system communicates the storyline message to a plurality of subscriber devices assigned to a plurality of different users;
- the server system receives response messages generated from at least two of the plurality of subscriber devices, each of the received response messages comprising a respective user-specified storyline option; and
- the next storyline message is based on the plurality of response messages received.

* * * * *